(12) United States Patent
Otomaru et al.

(10) Patent No.: US 10,885,643 B2
(45) Date of Patent: Jan. 5, 2021

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Itaru Otomaru, Kawasaki (JP); Kazuhiro Miyasa, Yokohama (JP); Kiyohide Satoh, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 15/225,591

(22) Filed: Aug. 1, 2016

(65) Prior Publication Data
US 2017/0039717 A1    Feb. 9, 2017

(30) Foreign Application Priority Data
Aug. 7, 2015  (JP) ................... 2015-157632

(51) Int. Cl.
*G06T 7/33*    (2017.01)

(52) U.S. Cl.
CPC ...... *G06T 7/33* (2017.01); *G06T 2207/10081* (2013.01); *G06T 2207/10088* (2013.01); *G06T 2207/10104* (2013.01); *G06T 2207/10108* (2013.01); *G06T 2207/30068* (2013.01); *G06T 2210/41* (2013.01)

(58) Field of Classification Search
None
See application file for complete search history.

(56) References Cited

U.S. PATENT DOCUMENTS

| 6,266,453 | B1 * | 7/2001 | Hibbard | G06T 3/0006 382/131 |
| 6,633,686 | B1 * | 10/2003 | Bakircioglu | G06K 9/6206 382/131 |
| 2006/0188134 | A1 * | 8/2006 | Quist | G06T 7/38 382/128 |
| 2007/0167784 | A1 * | 7/2007 | Shekhar | A61B 6/032 600/443 |

(Continued)

OTHER PUBLICATIONS

Zhou, Wu, and Yaoqin Xie. "Interactive Multigrid refinement for deformable image registration." BioMed research international 2013 (2013).*

(Continued)

*Primary Examiner* — Vu Le
*Assistant Examiner* — Tracy Mangialaschi
(74) *Attorney, Agent, or Firm* — Canon U.S.A., Inc. I.P. Division

(57) ABSTRACT

An image processing apparatus configured to calculate deformation between a first image and a second image includes a calculation order determination unit that determines calculation order of a plurality of partial regions into which the second image is divided, a calculation unit that calculates the deformation between the first image and the second image for each of the plurality of partial regions in the determined calculation order of the plurality of partial regions, a deformed image generation unit that generates a deformed image by deforming the first image based on the calculated deformation of the plurality of partial regions, and a display control unit that causes a display unit to display the generated deformed image.

17 Claims, 12 Drawing Sheets

(56) References Cited

U.S. PATENT DOCUMENTS

| | | | | |
|---|---|---|---|---|
| 2008/0298656 A1* | 12/2008 | Yim | ............... | A61B 6/481 |
| | | | | 382/128 |
| 2008/0316202 A1* | 12/2008 | Zhou | ............... | G06T 17/20 |
| | | | | 345/419 |
| 2008/0317317 A1* | 12/2008 | Shekhar | ............ | G06T 3/0081 |
| | | | | 382/131 |
| 2010/0021082 A1* | 1/2010 | Declerck | ............ | G06T 1/00 |
| | | | | 382/294 |

OTHER PUBLICATIONS

Smit, Noeska N., et al. "RegistrationShop: An Interactive 3D Medical Volume Registration System." VCBM. 2014.*

Buerger, Christian, Tobias Schaeffter, and Andrew P. King. "Hierarchical adaptive local affine registration for fast and robust respiratory motion estimation." Medical image analysis 15.4 (2011): 551-564.*

Khallaghi, Siavash, et al. "Experimental validation of an intrasubject elastic registration algorithm for dynamic- 3D ultrasound images." Medical physics 39.9 (2012): 5488-5497.*

D. Rueckert, L. I. Sonoda, C. Hayes, D. L. G. Hill, M. O. Leach, and D. J. Hawkes, "Nonrigid Registration Using Free-Form Deformations: Application to Breast MR Images;" IEEE Transactions on Medical Imaging, Vo.18, No. 8, Aug. 1999, pp. 712-721.

* cited by examiner

IMAGE PROCESSING APPARATUS, IMAGE PROCESSING METHOD, AND STORAGE MEDIUM

BACKGROUND

Field

Aspects of the present invention generally relate to an image processing apparatus, an image processing method, and a storage medium.

Description of the Related Art

In image diagnosis using medical images, a doctor performs a diagnosis while comparing images captured by a plurality of imaging apparatuses (modalities). However, it is difficult to identify lesions or to compare images because the orientation and shape of the subject vary from one image to another. Registration between a plurality of images has thus been attempted. As a method for performing registration between a plurality of images, D. Rueckert, L. Sonoda, C. Hayes, D. Hill, M. Leach, and D. Hawkes, "Nonrigid registration using free-form deformations: application to breast MR images," IEEE med. imag., vol. 18(8), pp. 712-721, 1999, discusses a technique for performing non-linear optimization based on iterative calculations with a similarity between two images as a cost function.

A registration algorithm for performing nonlinear optimization based on iterative calculations may need a large calculation cost. If an algorithm requiring such a large calculation cost is used for registration, it can take time to display a registration result of a region the user wants to observe.

SUMMARY

Aspects of the present invention are generally directed to an image processing apparatus, an image processing method, and a storage medium that can reduce time needed to register a first image and a second image.

According to an aspect of the present invention, an image processing apparatus configured to calculate deformation between a first image and a second image includes a calculation order determination unit configured to determine calculation order of a plurality of partial regions into which the second image is divided, a calculation unit configured to calculate the deformation between the first image and the second image for each of the plurality of partial regions in the determined calculation order of the plurality of partial regions, a deformed image generation unit configured to generate a deformed image by deforming the first image based on the calculated deformation of the plurality of partial regions, and a display control unit configured to cause a display unit to display the generated deformed image.

Further features of aspects of the present invention will become apparent from the following description of exemplary embodiments with reference to the attached drawings.

DESCRIPTION OF THE EMBODIMENTS

Exemplary embodiments of the present invention will be described below in an illustrative manner in detail with reference to the drawings. It should be noted that the components described in the exemplary embodiments are only illustrative, and the technical scope of aspects of the present invention is defined by the claims, not by the following individual exemplary embodiments.

A first exemplary embodiment will be described below. An image processing apparatus according to the first exemplary embodiment of the present invention performs registration between two images. The image processing apparatus calculates a displacement field (deformation) for deforming an image captured in a first deformation state (hereinafter, referred to as a first image) to perform registration of the deformed image with an image captured in a second deformation state (hereinafter, referred to as a second image) (in other words, estimates deformation between the images). In calculation processing for calculating the displacement field, the image processing apparatus calculates a local displacement field different from an final displacement field to be applied to the entire image (referred as a final displacement field), in order from regions closer to a certain cross section of the image. The image processing apparatus then displays a deformed image calculated by using the local displacement field. A user can thus observe a deformation result of a cross section to which the user pays attention (cross section of interest) even during the calculation of the final displacement field.

In the present exemplary embodiment, the displacement field is expressed by a model that has a "compact support" property. This property refers to that when the model expressing a displacement field is expressed by a large number of parameters, each parameter affects only the deformation of a local region in the image. The displacement field can thus be independently calculated in each local region in the image.

The present exemplary embodiment uses free form deformation (FFD) as a compact support model for expressing a displacement field. The FFD is a technique for parametrically expressing deformation by using "control amounts" assigned to "control points" arranged in a grid-like pattern within an image space. For example, conventional FFD-based image deformation is discussed in D. Rueckert, L. Sonoda, C. Hayes, D. Hill, M. Leach, and D. Hawkes, "Nonrigid registration using free-form deformations: application to breast MR images," IEEE med. imag., vol. 18(8), pp. 712-721, 1999. What is important to FFD-based deformation expression is to have a property that control points needed to express a displacement of a coordinate position are limited to a group of a small number of control points around the coordinate position. Such a property will hereinafter be referred to as compact support property.

Figure 4:
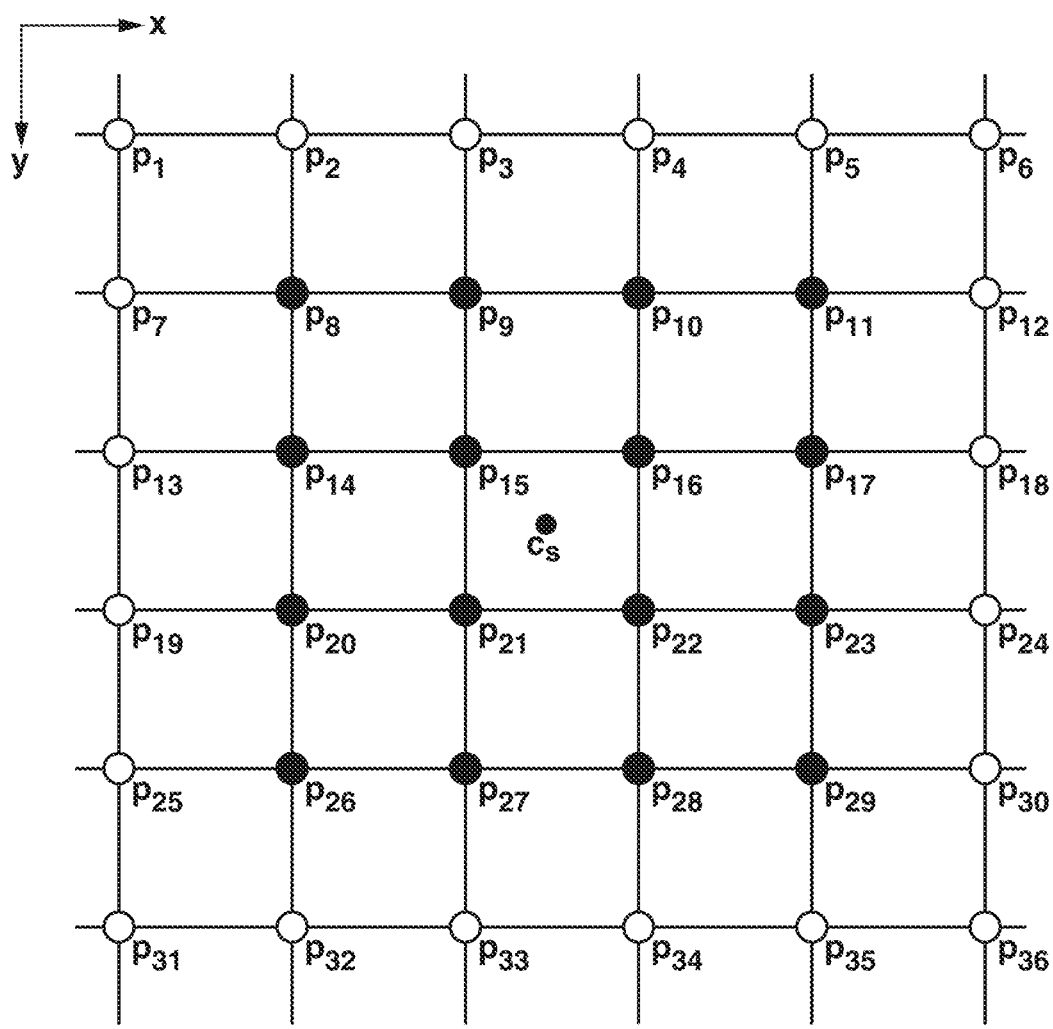
FIG. 4 is a schematic diagram illustrating a property of deformation expression by free form deformation (FFD).

FIG. 4 is a schematic diagram for describing the compact support property of FFD. In the present exemplary embodiment, processing targets are three-dimensional images and a deformation is expressed in a three-dimensional space, whereas a two-dimensional image is described here for the sake of convenience. Suppose that there are 36 control points $P=\{p_1, \ldots, p_{36}\}$ in the image space, and the control points P are used to express a displacement of a coordinate position $c_s=(x_s,y_s)$ on the image. Suppose also that a cubic B-spline function is used as the basic function of the FFD-based deformation expression. In such a case, a control point group $P_t$ involved with the displacement of the coordinate position $c_s$ includes two points in front of and two points behind $c_s$ in each axis direction, i.e., $P_t=\{p_8, \ldots, p_{11}, p_{14}, \ldots, p_{17}, p_{20}, \ldots, p_{23}, p_{26}, \ldots, p_{29}\}$. In FIG. 4, the control points included in the control point group $P_t$ are illustrated by black circles. In such a manner, to calculate the deformation at a coordinate position, only a control point group near the coordinate position needs to be taken into account and the other control point groups can be ignored. Because of such a property, it can be seen that to calculate a displacement field of a local region, only a control point group around the local region needs to be taken into account.

The image processing apparatus according to the present exemplary embodiment uses a cross section specified by the user as the region of interest (cross section of interest) and sets order of displacement field calculation with respect to all regions of the second image based on the region of interest. An image region is divided into a plurality of partial regions, each being a set of cross sections where "the same control point group is involved with deformation." A partial region including the region of interest (hereinafter, referred to as a priority partial region) comes first in order. The closer a partial region is to the region of interest, the earlier the partial region is set to be in order. If the displacement field calculation on the region of interest is completed, the calculated displacement field is immediately applied to the first image and the deformed image obtained thereby (deformed image) is displayed on a display unit. If the region of interest is changed by the user's instructions during displacement field calculation, the order of displacement field calculation is set again based on the changed region of interest. In such a manner, the region of interest specified by the user is subjected to displacement field calculation processing by the highest priority at any timing without a wait for the completion of the displacement field calculation of all the regions. The image processing apparatus according to the present exemplary embodiment performs registration between the two images by executing the foregoing characteristic processing.

As employed herein, a "displacement field" indicates which position on the first image a position on the second image corresponds to (how the points on the images are displaced between the images). For example, a displacement field is expressed as a set of pieces of data indicating which position on the first image each of the coordinate positions of all voxels in the second image corresponds to.

The displacement field calculation is performed, for example, under a constraint that a similarity between the two images be maximized. To calculate the similarity, various known methods can be used, including a sum of squared difference (SSD), cross correlation, and a mutual information. A configuration and processing of the image processing apparatus according to the present exemplary embodiment will be described below with reference to FIGS. 1 to 6.

Figure 1:
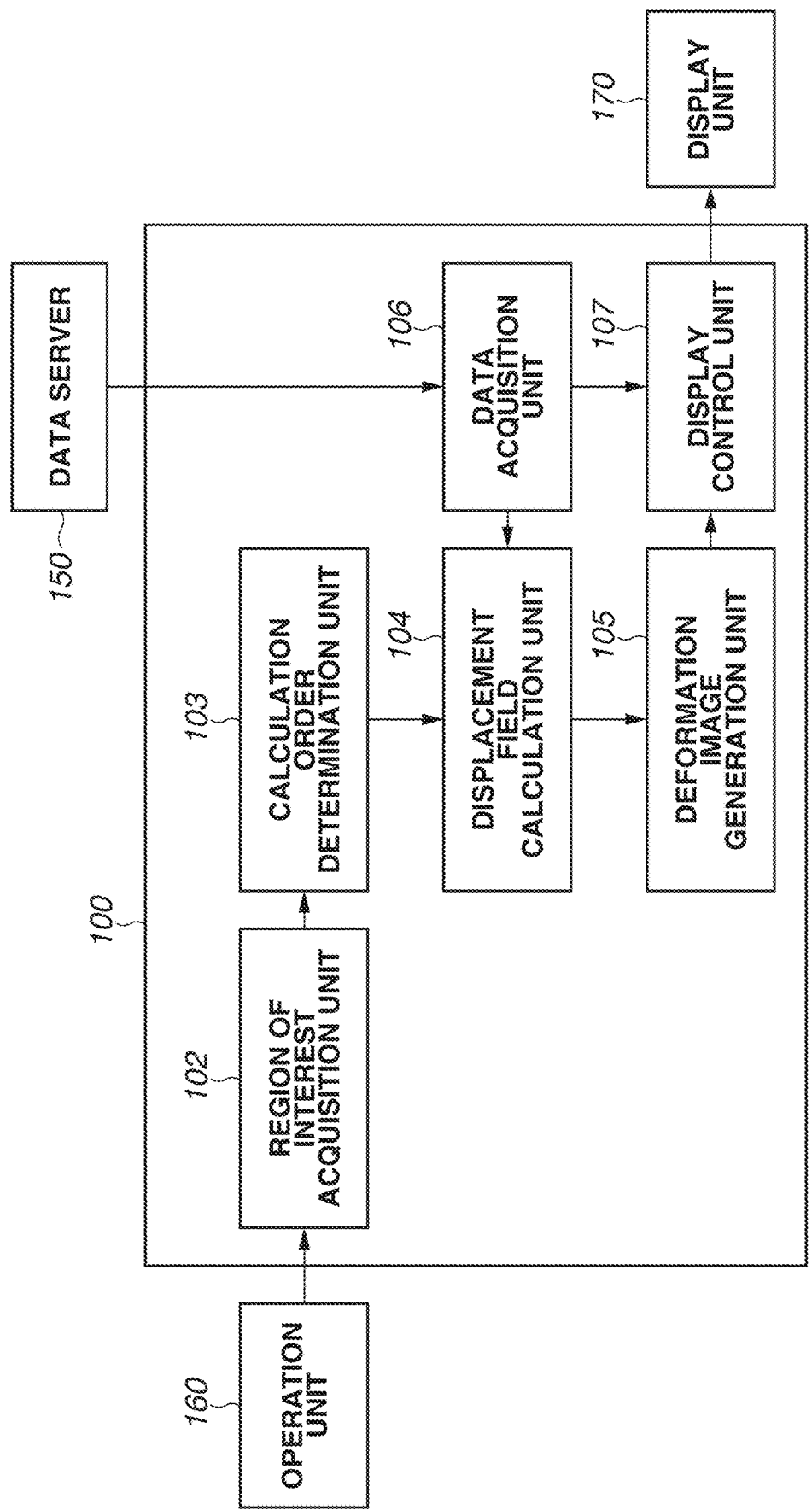
FIG. 1 is a diagram illustrating a configuration example of an image processing apparatus according to a first exemplary embodiment.

FIG. 1 is a diagram illustrating a configuration example of an image processing system according to the present exemplary embodiment. The image processing system includes an image processing apparatus 100, a data server 150, an operation unit 160, and a display unit 170. The image processing apparatus 100 is connected to the data server 150, the operation unit 160, and the display unit 170.

A first image and a second image retained in the data server 150 are three-dimensional tomographic images obtained by imaging a subject in advance under different conditions (different modalities, imaging modes, dates and times, and/or body positions). Examples of imaging apparatuses (modalities) for capturing the three-dimensional tomographic images can include a magnetic resonance imaging (MRI) apparatus, an X-ray computed tomography (CT) apparatus, a three-dimensional ultrasonic imaging apparatus, a photoacoustic tomography apparatus, a positron emission tomography apparatus (PET)/single photon emission computed tomography apparatus (SPECT), and an optical coherence tomography (OCT) apparatus.

For example, the first and second images can be ones captured by different modalities or in different imaging modes around the same time. The first and second images can be images of the same patient in the same body posture, captured by the same modality on different dates and times for follow-up purposes. The first and second images are configured as a set of two-dimensional cross-sectional images. The position and orientation of each of the two-dimensional cross-sectional images are converted to a reference coordinate system (coordinate system in a space with reference to the subject) and stored in the data server 150. The first and second images expressed in the reference coordinate system are input to the image processing apparatus 100 via a data acquisition unit 106.

The operation unit 160 accepts the user's operation via a mouse, a keyboard, and a graphical user interface (GUI) provided in the display unit 170, and inputs which cross section in an image is specified to be a region of interest (cross section of interest) to the image processing apparatus 100 via a region of interest acquisition unit 102 to be described below. As employed herein, the region of interest is specified on the second image. Details will be described below. The region of interest can be obtained even during displacement field calculation. If the region of interest is changed during displacement field calculation, the updated information is input to the image processing apparatus 100 and the order of displacement field calculation is set again.

The display unit 170 displays a display image generated by the image processing apparatus 100 and various types of information such as the progress of displacement field calculation. The display unit 170 includes the GUI for accepting instructions from the user.

The image processing apparatus 100 includes the region of interest acquisition unit 102, a calculation order determination unit 103, a displacement field calculation unit 104, a deformed image generation unit 105, the data acquisition unit 106, and a display control unit 107. The data acquisition unit 106 acquires the first and second images input from the data server 150, and outputs the first and second images to the displacement field calculation unit 104 and the display control unit 107.

The region of interest acquisition unit 102 acquires the region of interest (cross section of interest) on the second image from the operation unit 160. For example, the region of interest acquisition unit 102 acquires the region of interest on the second image according to the user's instructions, and stores position information about the region of interest into a not-illustrated storage unit. The region of interest acquisition unit 102 then outputs the position information about the region of interest, stored in the storage unit, to the calculation order determination unit 103.

Based on the position information about the region of interest, the calculation order determination unit 103 determines the order of calculation of a displacement field (displacement field calculation order) about a plurality of partial regions into which the second image is divided. The calculation order determination unit 103 then outputs the determined displacement field calculation order about the partial regions to the displacement field calculation unit 104.

The displacement field calculation unit 104 calculates a displacement field (deformation) between the first image and the second image for each of the partial regions in the displacement field calculation order of the partial regions determined by the calculation order determination unit 103. The displacement field calculation unit 104 initially determines a partial region in which a displacement field is to be calculated (displacement field calculation target region) based on the displacement field calculation order determined by the calculation order determination unit 103. The displacement field calculation unit 104 then performs displacement field calculation only on the displacement field calculation target region, stores the calculation result into the not-illustrated storage unit, and outputs the calculation result to the deformed image generation unit 105. Details of the method for displacement field calculation will be described below in conjunction with step S2040 of the flowchart illustrated in FIG. 2.

Based on the displacement field of the partial region calculated by the displacement field calculation unit 104, the deformed image generation unit 105 generates a corresponding cross-sectional image (deformed image) of the first image corresponding to the cross section of interest on the second image by deforming a partial region on the first image corresponding to the cross section of interest. The deformed image generation unit 105 outputs the generated deformed image to the display control unit 107. It is also possible to generate a subtraction image between the image of the cross section of interest on the second image and the corresponding cross-sectional image (deformed image) of the first image corresponding to the cross section of interest, and output the subtraction image to the display control unit 107 instead of the deformed image.

The display control unit 107 performs display control for causing the display unit 170 to display the image of the cross section of interest on the second image and the corresponding cross-sectional image (deformed image) of the first image corresponding to the cross section of interest, generated by the deformed image generation unit 105.

Figure 2:
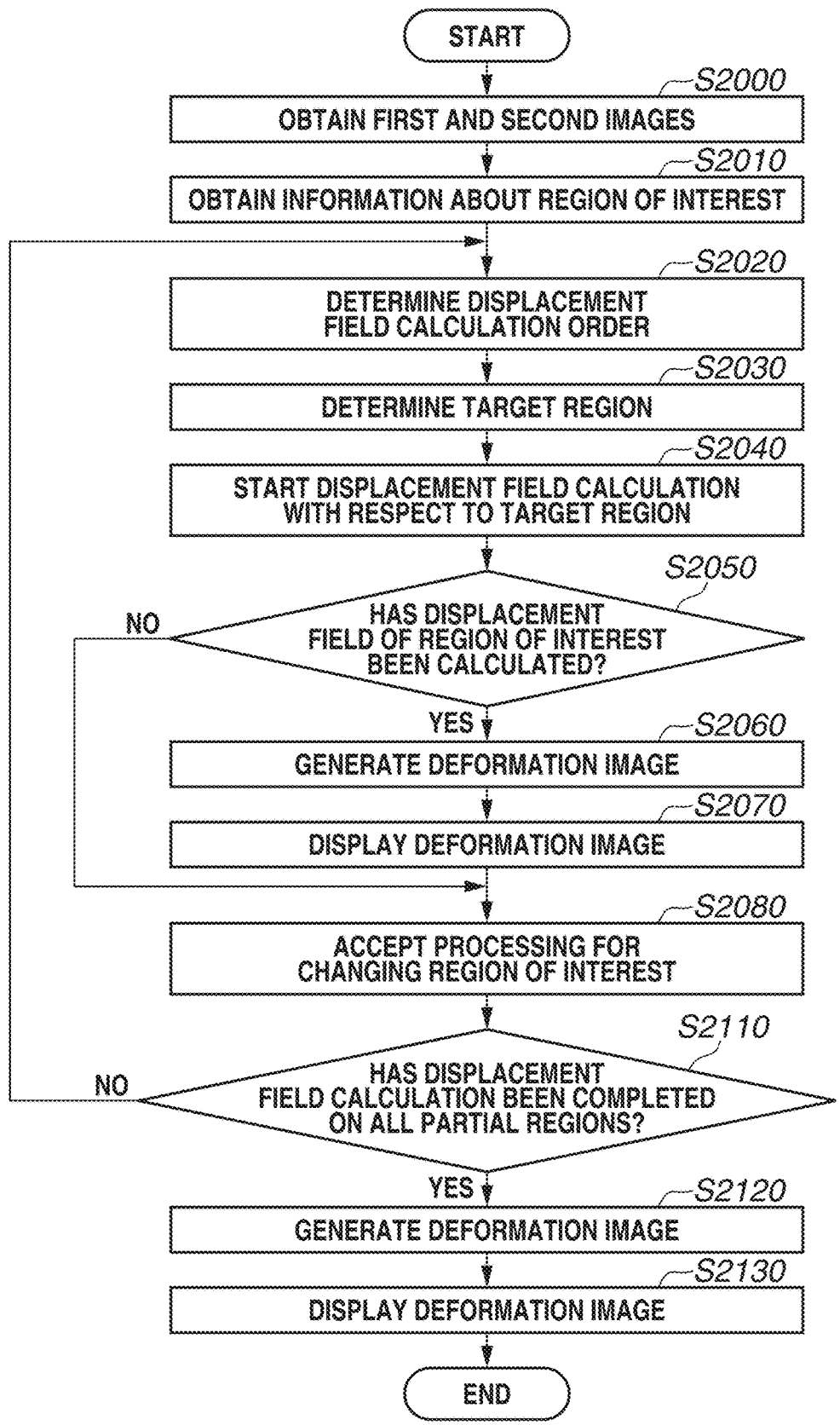
FIG. 2 is a flowchart illustrating a processing procedure according to the first exemplary embodiment.

FIG. 2 is a flowchart illustrating a processing procedure of an image processing method performed by the image processing apparatus 100. In step S2000, the data acquisition unit 106 initially acquires the first and second images from the data server 150. As described above, the first and second images both are three-dimensional images each including a plurality of cross-sectional images. If the images include supplementary information such as patient information and diagnostic information, the data acquisition unit 106 also acquires such supplementary information at the same time.

In step S2010, the region of interest acquisition unit 102 acquires information about which cross section on the second image is specified as a region of interest (cross section of interest) from the operation unit 160 according to the user's instructions.

Figure 3:
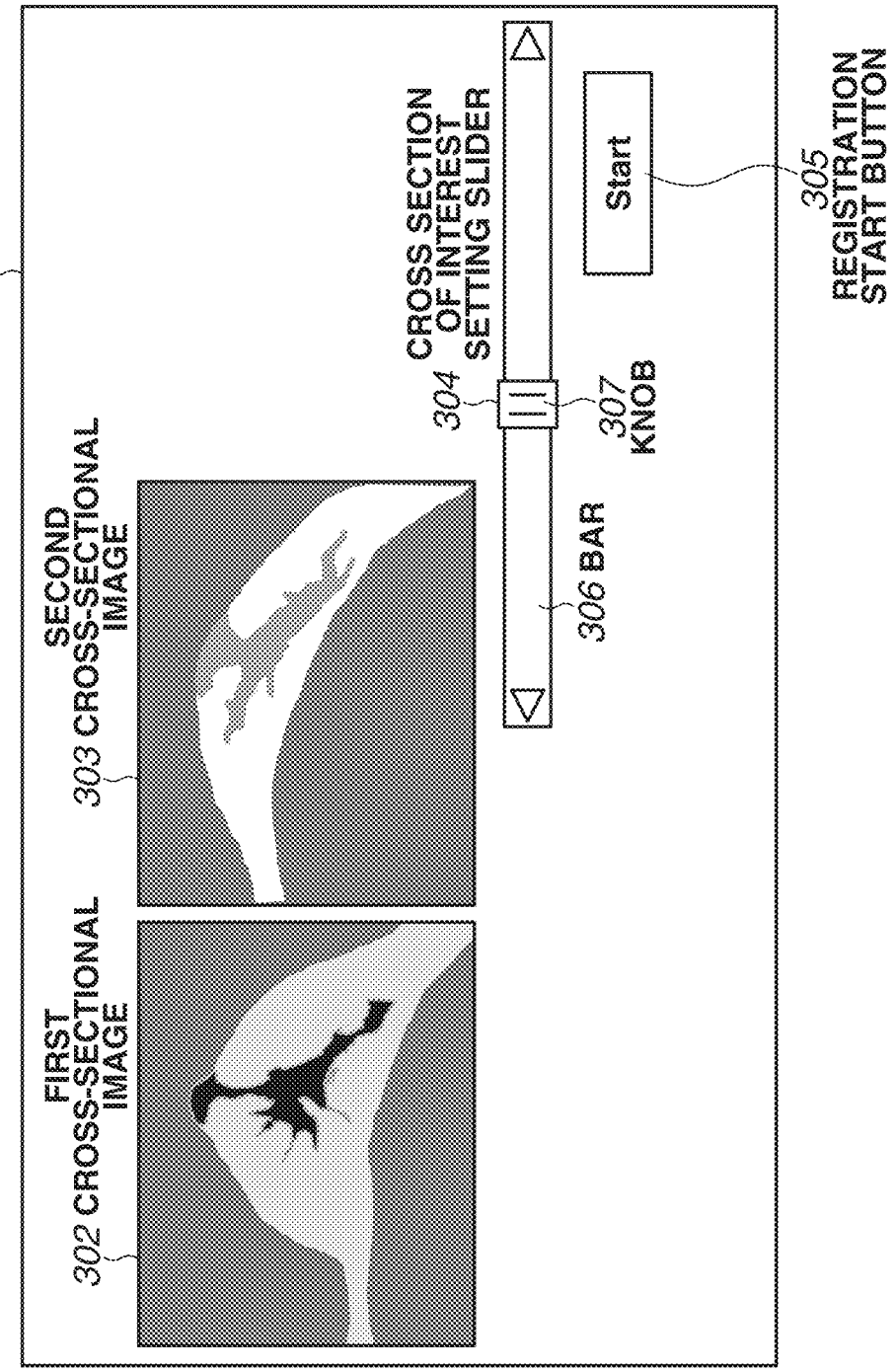
FIG. 3 is a diagram illustrating a screen configuration of a display unit when an input image is displayed thereon, according to the first exemplary embodiment.

FIG. 3 illustrates an example of a display screen 301 displayed on the display unit 170 in obtaining the region of interest. The display control unit 107 generates predetermined cross-sectional images from the respective first and second images according to the user's instructions, and displays the cross-sectional images in the display screen 301 of the display unit 170 as a first cross-sectional image 302 and a second cross-sectional image 303, respectively. On the display screen 301, the user operates a cross section of interest setting slider 304 (including a bar 306 and a knob 307) to switch display of the second cross-sectional image 303, and searches for a cross-sectional image of which the user wants to observe a deformation result by priority. If the user presses a registration start button 305, the region of interest acquisition unit 102 stores the position information of the cross section as a region of interest (cross section of interest). The processing proceeds to step S2020.

The foregoing operation method is just an example. The image processing apparatus 100 can be configured to use any operation method for implementing the specification of a certain cross-sectional image from a three-dimensional image. For example, instead of operating the cross section of interest setting slider 304, the user can switch cross-sectional images by operating a mouse wheel on the display area of the second cross-sectional image 303. Aside from the displayed cross section being set as the cross section of interest, the user can specify the cross section of interest by directly specifying an identifier (slice number) of the cross section. If the supplementary information about the second image obtained in step S2000 includes information about a cross section to pay attention to on the second image, the cross section can be set as the cross section of interest. If the supplementary information about the second image obtained in step S2000 includes information about a region or coordinates representing a portion of interest in the subject, such as a tumor and an anatomical site (nipple, etc.), a cross section including the region or coordinates can be set as the cross section of interest.

In step S2020, the calculation order determination unit 103 determines the order of displacement field calculation about all the regions of the second image based on the position information about the region of interest obtained in step S2010 (or changed in step S2080). If the processing of step S2020 is performed for the second or subsequent time and the region of interest is not changed from the previous time, the processing of this step S2020 can be omitted.

Figure 5:
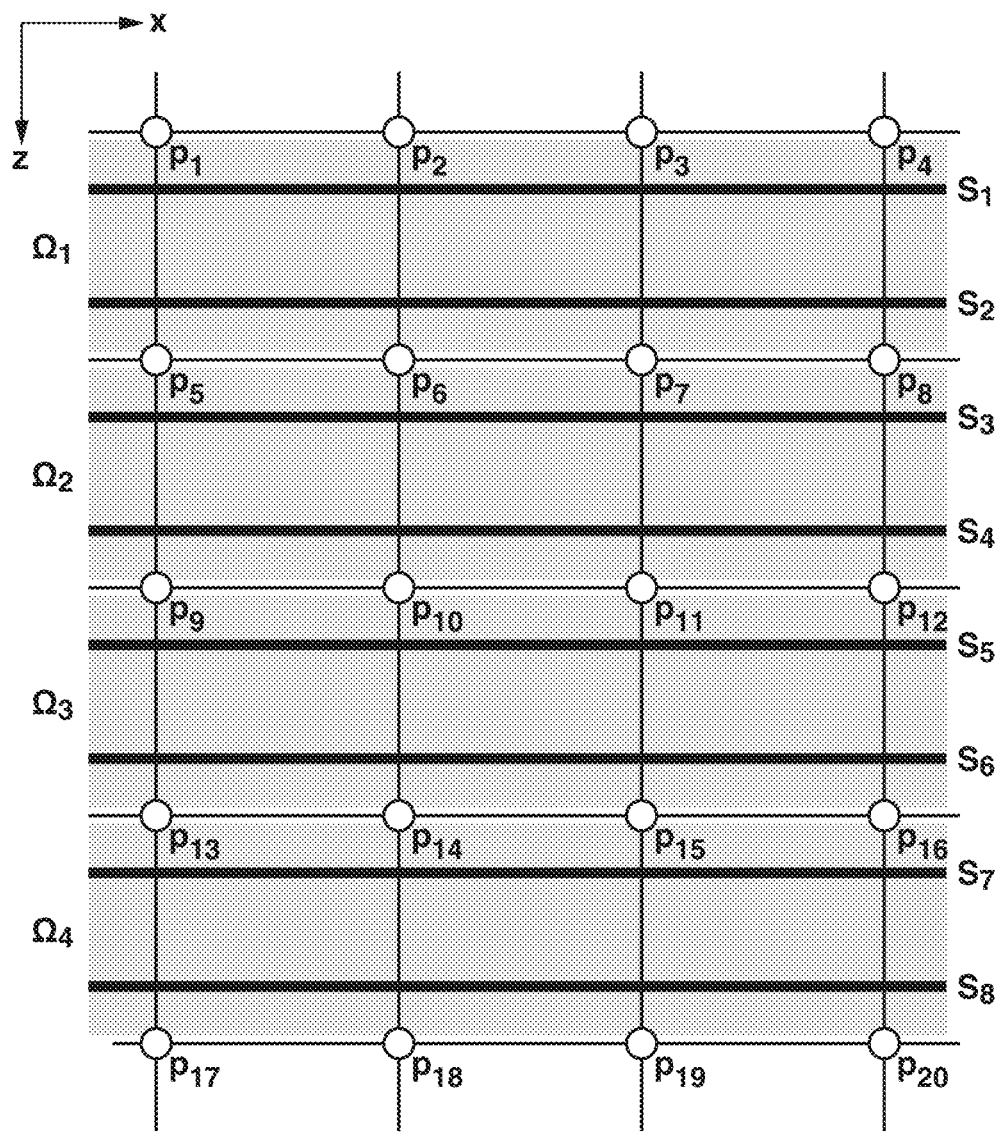
FIG. 5 is a schematic diagram illustrating a procedure for displacement field calculation using FFD.

FIG. 5 is a schematic diagram for describing a method for determining the displacement field calculation order. FIG. 5 illustrates a second image and an FFD control point group in a two-dimensional schematic view taken in a direction (Y-axis direction) parallel to cross sections. In other words, cross sections ($S_1, \ldots, S_8$) each being a two-dimensional image are illustrated by straight lines in FIG. 5. Suppose that the cross sections constituting the second image are images parallel to the X-Y plane. Suppose also that the cross section of interest selected in step S2010 is the cross section $S_4$.

The calculation order determination unit 103 initially calculates partial regions in which "the same control point group is involved with deformation" based on the grid on which the FFD control point group is arranged. In other words, the calculation order determination unit 103 divides the second image into a plurality of partial regions. The partial regions each are a set of cross sections. In FIG. 5, the calculated partial regions $\Omega_1, \ldots, \Omega_4$ are illustrated as regions filled in gray. In FIG. 5, the partial region $\Omega_1$, the partial region $\Omega_2$, the partial region $\Omega_3$, and the partial region $\Omega_4$ includes the cross sections $S_1$ and $S_2$, the cross sections $S_3$ and $S_4$, the cross sections $S_5$ and $S_6$, and the cross sections $S_7$ and $S_8$, respectively. The partial regions $\Omega_1$ to $\Omega_4$ each include cross sections or a cross section group constituting the second image. The calculation order determination unit 103 then determines the displacement field calculation order for each of the foregoing partial regions $\Omega_1$ to $\Omega_4$. In particular, the calculation order determination unit 103 determines that the partial region including the cross section of interest comes first, and sets the first partial region to calculate a displacement field of as a priority partial region. In FIG. 5, the partial region $\Omega_2$ including the cross section of interest $S_4$ is the priority partial region. The calculation order determination unit 103 then sets the order of displacement field calculation of the partial regions in ascending order of the shortest distance to the cross section of interest $S_4$. In the case of FIG. 5, the partial region $\Omega_3$ comes the second, the partial region $\Omega_1$ the third, and the partial region $\Omega_4$ the fourth. The calculation order determination unit 103 stores order information set thus into the not-illustrated storage unit.

In the foregoing example, regions in which the same control point group is involved with deformation all belong to the same partial region. However, partial regions can be divided into smaller units. For example, the partial region $\Omega_1$ in FIG. 5 is divided into two or three smaller units. According to such a processing method, a partial region in which displacement field calculation is to be performed at a time becomes smaller. This can reduce the calculation cost of the displacement field calculation in each partial region.

In step S2030, the displacement field calculation unit 104 determines, prior to displacement field calculation, which partial region on the second image is to be a target region (displacement field calculation target region) $\Omega_t$ on which processing for displacement field calculation is to be performed. The displacement field calculation unit 104 determines the displacement field calculation target region $\Omega_t$ by the following procedure. Suppose that information indicating in which partial regions on the second image a displacement field has been calculated and in which partial regions the displacement field has not been calculated is stored in the not-illustrated storage unit. Suppose also that as described in step S2020, the order of displacement field calculation for all the partial regions of the second image is stored in the not-illustrated storage unit. Based on such information, the displacement field calculation unit 104 determines a partial region in which the displacement field has not been calculated and that comes earliest in the displacement field calculation order to be the displacement field calculation target region $\Omega_t$.

In step S2040, the displacement field calculation unit 104 starts displacement field calculation on the displacement field calculation target region $\Omega_t$ selected in step S2030. If the processing of this step S2040 is performed for the second or subsequent time and there is a target region on which displacement field calculation processing is being performed, the displacement field calculation field 104 initially determines whether the displacement field calculation target region $\Omega_t$ selected in step S2030 is the same as the target region under the displacement field calculation processing. If the displacement field calculation target region $\Omega_t$ is the same as the target region under the displacement field calculation processing (i.e., if the partial region to be processed by priority is not changed), the displacement field calculation unit 104 simply continues the displacement field calculation processing on the target region under the displacement field calculation processing. On the other hand, if the displacement field calculation target region $\Omega_t$ is not the same as the target region under the displacement field calculation processing (i.e., if the target region to be processed by priority is changed), the displacement field calculation unit 104 discontinues the displacement field calculation processing of the target region under the displacement field calculation processing, and starts processing the new displacement field calculation target region $\Omega_t$. When discontinuing the displacement field calculation processing, the displacement field calculation unit 104 once stores control amounts calculated in the course of iterative optimization up to that point in time into the not-illustrated storage unit. The displacement field calculation unit 104 leaves information about whether the displacement field has been calculated in the displacement field calculation target region $\Omega_t$ "uncalculated." Then, if, in step S2040, this displacement field calculation target region is selected again as the displacement field calculation target region $\Omega_t$, the displacement field calculation unit 104 reads the control amounts calculated in the course of optimization, which has been stored in the not-illustrated storage unit, and resumes the displacement field calculation processing with the control amounts as initial values.

Since the displacement field calculation unit 104 performs the displacement field calculation on only a certain region, the calculation cost can be suppressed to be smaller than when the displacement field calculation is performed on the entire second image. Note that the displacement field calculation unit 104 does not wait for the completion of the displacement field calculation in step S2040, and the processing transitions to the next step S2050. This means that the displacement field calculation processing runs in the background, and the user's operation such as switching of cross sections of interest are accepted even when the displacement field calculation is being performed. Whether the displacement field calculation processing running in the background is completed is determined in step S2050 to be described below.

Details of the processing of step S2040 are described below in order of [1] a precondition for displacement field calculation and [2] a displacement field calculation processing procedure.

The precondition for displacement field calculation is that the displacement field to be calculated in the present exemplary embodiment is a displacement field "in an inverse direction" (hereinafter, referred to as an "inverse displacement field"). An inverse displacement field refers to a "displacement field directed from the second image to the first image," and expresses "which coordinate position on the first image each of the voxel coordinates on the second image corresponds to." In deformable registration, the displacement field to be calculated is typically an inverse displacement field. The reason is that what is needed to generate a deformed image by deforming the first image is "deformation information in an inverse direction" that is "an intensity in a position on the first image corresponding to a certain voxel on the second image." Since the displacement field to be calculated in the present exemplary embodiment is an inverse displacement field, the FFD control point group arranged in a grid-like pattern is arranged on the second image. The grid of the control point group therefore remains unchanged even if the first image is deformed sequentially from an undeformed state during the displacement field calculation.

The method for calculating a displacement field will be described using FIG. 5. Suppose that in FIG. 5, the partial region $\Omega_2$ is the displacement field calculation target region $\Omega_r$. Suppose also that a control point group $P=\{p_1, \ldots, p_{20}\}$ is arranged on the second image. A control amount $v_k$ at a certain control point $p_k$ is expressed by a three-dimensional vector given by the following equation (Eq.) (1):

$$V_k = (v_{xk}, v_{yk}, v_{zk}) \tag{1}$$

Here, $v_{xk}$, $v_{yk}$, and $v_{zk}$ are control amounts in the X-, Y-, and Z-axis directions, respectively. A set of control points involved with the deformation of the displacement field calculation target region $\Omega_t$ will be denoted as $P_t$, and a set of control points not involved with the deformation as $P_u$. Each control point belongs to either $P_t$ or $P_u$. In the case of FIG. 5, $P_t$ and $P_u$ related to the partial region $\Omega_2$ are as follows:

$$P_t = \{p_1, \ldots, p_{16}\}$$

$$P_u = \{p_{17}, \ldots, p_{20}\}$$

A vector formed by arranging the control amounts of the control point group $P_t$ in a row will be denoted as $v_t$. Using the control amount $v_t$ of the control point group $P_t$ involved with the deformation, a cost function of the displacement field calculation is expressed by the following Eq. (2):

$$f(\Omega_t, v_t) = \sum_{x \in \Omega_t} (I_f(x) - I_m(D(x, v_t)))^2 \tag{2}$$

Here, $\Omega_t$ is the displacement field calculation target region (in FIG. 5, $\Omega_2$). $I_m(x)$ and $I_f(x)$ are functions for obtaining the intensities of the first image and the second image at a coordinate position x, respectively. $D(x,v)$ is a function for determining the displacement destination of the coordinate position x by using a control amount vector v. This Eq. (2) means that the SSD between the deformed image of the first image and the second image is determined within displacement field calculation target region $\Omega_t$. The displacement field calculation means determining the control amount $v_t$ that minimizes the value of the foregoing cost function. That is, in step S2040, the displacement field calculation unit 104 starts processing for determining the control amount $v_t$ that minimizes the cost function of Eq. (2) as the processing for calculating the displacement field in the displacement field calculation target region $\Omega_t$. To calculate optimal $v_t$, the displacement field calculation unit 104 can use known optimization techniques such as the steepest descendent method and the conjugate gradient method. The calculated control amounts for the respective control points in the control point group $P_t$ are stored in the not-illustrated storage unit.

As a special case of displacement field calculation, the control point group $P_t$ of a control amount calculation target can include a control point or points that has/have been previously used for displacement field calculation and the value(s) of the control amount(s) therefore is/are already stored. For example, suppose that in FIG. 5, displacement field calculation on the partial region $\Omega_3$ is performed in a state where the displacement field calculation on the partial region $\Omega_2$ has been completed. The control point group $p_5$ to $p_{20}$ involved with the deformation of the partial region $\Omega_3$ includes the control points $p_5$ to $p_{16}$ of which the control amounts are already calculated in the phase of displacement field calculation on the partial region $\Omega_2$. If a control point is thus involved with deformation of a plurality of partial regions, the displacement field calculation unit 104 calculates a new control amount by assigning weights to the values of the control amounts calculated for the respective cross-sectional images according to the order of the displacement field calculation.

The processing procedure in the foregoing case will be concretely described. Suppose that the second image includes a control point p that is involved with deformation of N partial regions $\Omega_2, \ldots, \Omega_N$ in ascending order of the displacement field calculation order. The partial regions $\Omega_1, \Omega_2, \ldots, \Omega_N$ have displacement field calculation order of $j_1, j_2, \ldots, j_N$ ($j_1 < j_2 < \ldots < j_N$), respectively. The displacement field calculation unit 104 calculates the adjusted control amount v of the control point p by the following Eq. (3):

$$v = \frac{j_N}{\sum_{k=1}^{N} j_k} v_{\Omega_1} + \frac{j_{N-1}}{\sum_{k=1}^{N} j_k} v_{\Omega_2} + \cdots + \frac{j_1}{\sum_{k=1}^{N} j_k} v_{\Omega_N} \tag{3}$$

Here, $v_{\Omega k}$ is the control amount obtained by performing displacement field calculation on the partial region $\Omega_k$. Eq. (3) mean that a value obtained by weighted averaging of the control amounts $v_{\Omega 1}, \ldots, v_{\Omega N}$ according to the displacement field calculation order is to be the new control value v. The earlier the displacement field calculation order is, i.e., the smaller the value of the displacement field calculation order j is, the greater the value of the coefficient of the corresponding term in Eq. (3) becomes. The latter the displacement field calculation order is, the smaller the value of the coefficient becomes. In such a manner, the weights are assigned according to the displacement field calculation order so that the control amounts of partial regions that come earlier in the displacement field calculation order are considered more important. Even if a control point is involved with the deformation calculation of a plurality of cross-sectional images, the control amount on which the displacement field calculation results of all the cross-sectional images involved are reflected can thus be determined.

For the cost function, the displacement field calculation unit 104 does not necessarily need to use the SSD and can use other similarity indexes such as normalized cross correlation and mutual information. The displacement field calculation unit 104 does not necessarily need to use a similarity between two images, either, and can use an index for evaluating a positional error between anatomical feature points extracted from the images.

After the control amounts of the control point group involved with the deformation of the displacement field calculation target region $\Omega_t$ are calculated, the displacement field calculation unit 104 calculates a displacement field from the values of the control amounts. The displacement field calculation unit 104 stores the displacement field into the not-illustrated storage unit along with the index of the partial region number.

In step S2050, the displacement field calculation unit 104 determines whether the displacement field of the region of interest has been calculated. The displacement field calculation unit 104 makes the determination depending on whether displacement field data corresponding to the index of the partial region (priority partial region) including the region of interest is stored in the not-illustrated storage unit. If the displacement field is determined to have been calculated (YES in step S2050), the processing proceeds to step S2060. If, on the other hand, the displacement field is determined to have not been calculated (NO in step S2050), the processing proceeds to step S2080.

In step S2060, the deformed image generation unit 105 generates a deformed image (corresponding cross-sectional image of the first image corresponding to the cross section of interest) by deforming the partial region of the first image corresponding to the cross section of interest of the second image based on the displacement field calculated in step S2040. The deformed image will be described further. As described in the description of step S2040, the displacement field calculated in the present exemplary embodiment is an inverse displacement field directed from the second image to the first image. Assuming that the cross section of interest in the second image is $S_k$, a deformed image $I_m'$ formed by deforming the first image is expressed by the following Eq. (4):

$$I_m'(x)=I_m(D(x,P_t))(x \in S_k) \quad (4)$$

For each coordinate x on the cross section of interest of the second image, the deformed image generation unit 105 performs processing for determining corresponding coordinates $D(x,P_t)$ on the first image and assuming an intensity $I_m(D(x,P_t))$ at the coordinates $D(x,P_t)$ to be an intensity $I_m'(x)$ at the coordinate x of the deformed image to be generated.

In step S2070, the display control unit 107 causes the display unit 170 to display the deformed image generated by the deformed image generation unit 105. The processing proceeds to step S2080.

Figure 6:
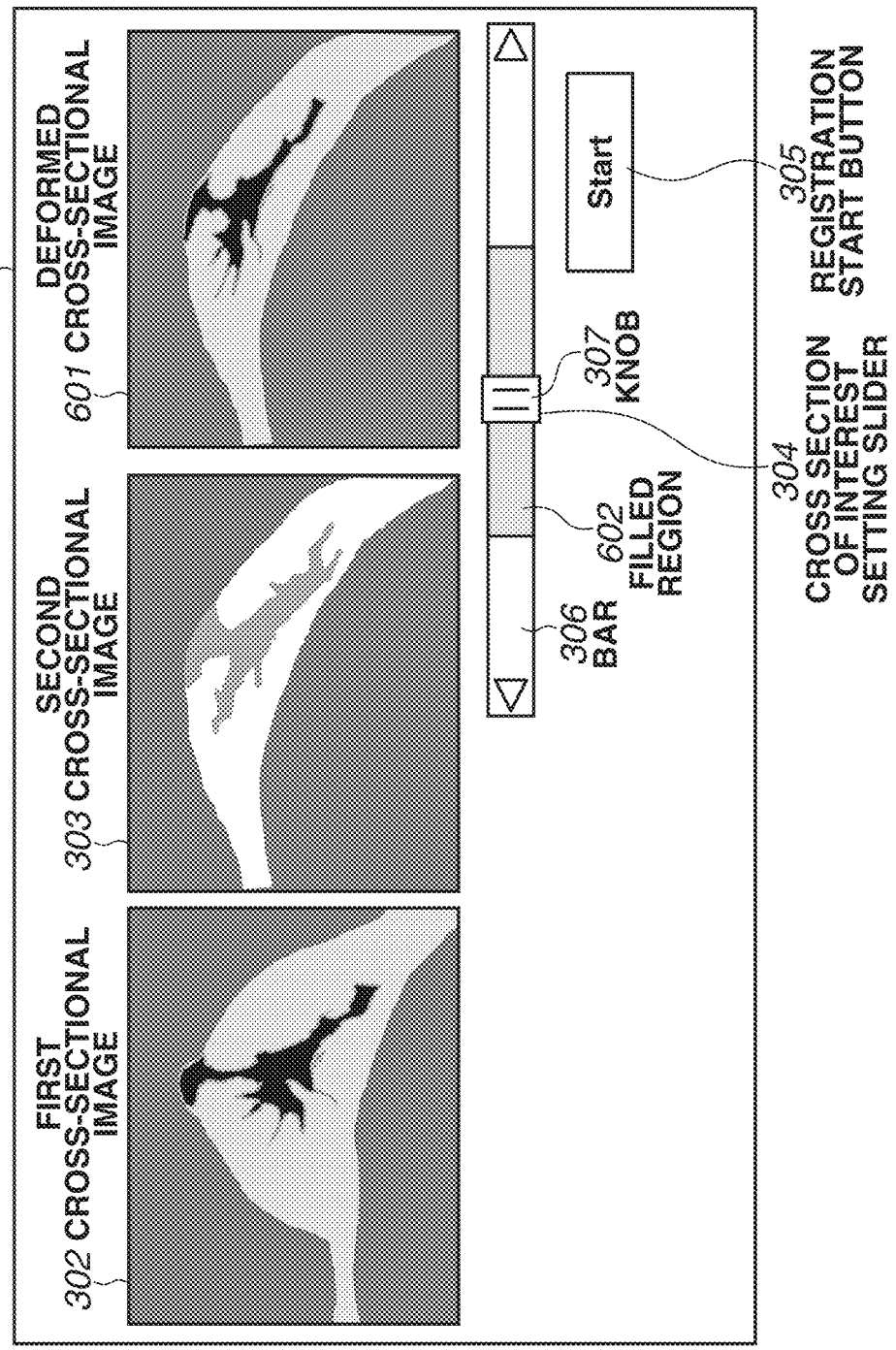
FIG. 6 is a diagram illustrating a screen configuration of the display unit when a deformed image is displayed thereon, according to the first exemplary embodiment.

FIG. 6 illustrates an example of the display screen 301 displayed on the display unit 170 when the deformed image is displayed. As in the case of obtaining a cross section of interest (FIG. 3), the display control unit 107 causes the display unit 170 to display the first cross-sectional image 302 and the second cross-sectional image 303. The display control unit 107 also causes the display unit 170 to display a deformed cross-sectional image 601 (deformed image) generated by the deformed image generation unit 105 in step S2060. In addition, the display control unit 107 causes the display unit 170 to display information indicating the range of cross sections in which the displacement field has been calculated by the displacement field calculation unit 104, in association with information indicating the position of the cross section of interest. For example, the display control unit 107 presents information about a region or regions corresponding to a cross section group in which the displacement field has been calculated on the cross section of interest setting slider 304 for setting the cross section of interest. For example, the display control unit 107 performs processing for filling a region on the bar 306 in certain color, the region corresponding to the cross section group in which the displacement field has been calculated. The display control unit 107 performs such processing by obtaining the index(es) of the partial region(s) in which the displacement field has been calculated from the not-illustrated storage unit. In the display example illustrated in FIG. 6, cross sections lying in a filled region 602 that is illustrated in gray on the cross section of interest setting slider 304 are the ones in which the displacement field has been calculated.

The foregoing display method is an example, and the display control unit 107 can be configured to use any arbitrary display method for presenting a deformation state and a deformed cross-sectional image. For example, instead of the deformed image, the display control unit 107 can use a method for displaying a "displacement field image" that expresses the intensity of the displacement amount of each voxel in the cross-sectional image by intensity.

In step S2080, the region of interest acquisition unit 102 accepts processing for changing the cross section of interest by the user's operation. As described in the description of step S2040, the image processing apparatus 100 accepts the user's operation input to the region of interest acquisition unit 102 (operation for switching the displayed cross section of the second cross-sectional image 303) even while calculating the displacement field with respect to the displacement field calculation target region $\Omega_t$. If the displayed cross section is switched, the region of interest acquisition unit 102 determines that the displayed cross section is specified as a new region of interest (cross section of interest) (that the regions of interest are switched), and updates the position information about the region of interest stored in the not-illustrated storage unit.

In step S2110, the image processing apparatus 100 determines whether the displacement field calculation has been completed on all the partial regions of the second image. If the displacement field calculation processing is determined to have been completed on all the partial regions (YES in step S2110), the processing proceeds to step S2120. If the displacement field calculation processing is determined to have not been completed (NO in step S2110), the processing returns to step S2020. And, when the region of interest is changed, the image processing apparatus 100 reconfigures the displacement field calculation order. Then the image processing apparatus 100 performs the displacement field calculation processing on the next partial region in the displacement field calculation order.

As described above, the processing of steps S2060 to S2080 is performed before the displacement field calculation unit 104 finishes calculating the deformation of all the partial regions. In step S2060, the deformed image generation unit 105 generates a deformed image of the first image corresponding to part of the partial regions of which the displacement field calculation unit 104 has finished calculating deformation. In step S2070, the display control unit 107 performs control so that the deformed image of the first image corresponding to the part of the partial regions, generated by the deformed image generation unit 105, is displayed. In step S2080, the region of interest acquisition unit 102 is instructed to change the calculation order of the plurality of partial regions. The displacement field calculation unit 104 then discontinues calculating deformation. In subsequent step S2020, the calculation order determination unit 103 changes the calculation order of the plurality of partial regions. In subsequent step S2040, the displacement field calculation unit 104 calculates deformation between the partial regions of the first and second images in the changed order of calculation.

In step S2120, the deformed image generation unit 105 generates a three-dimensional deformed image by deforming the entire first image, using the control amounts of all the control points finally optimized, which have been stored in the not-illustrated storage unit. The processing of this step S2120 is similar to the processing implemented by Eq. (4) in step S2060 except that the voxel positions X to be calculated range across the entire image region of the second image and the control amount $P_t$ used in the deformation calculation is that of all the control points.

In step S2130, the display control unit 107 causes the display unit 170 to display the final deformed image generated by the deformed image generation unit 105 in step S2120. The processing of this step S2130 is similar to that of step S2070. After the display of the deformed image, the operation unit 160 accepts an "end of observation of the deformed image" by the user's operation, and then the processing of the image processing apparatus 100 ends.

According to the present exemplary embodiment, the user can observe the deformation result of the region to be given priority without waiting for an end of the displacement field calculation processing on the entire image even if the displacement field calculation processing employs a time-consuming algorithm.

(First Modification of First Exemplary Embodiment)

In the foregoing example, if, in the displacement field calculation (step S2040), a control point is involved with the displacement field calculation of a plurality of partial regions, the displacement field in the second and subsequent partial regions is described to be determined by performing weighted averaging the displacement fields calculated for the respective partial regions. However, the displacement field calculation unit 104 can be configured to simply average all the control amounts into a new control amount without determining performing weighted averaging. In such a case, even if the regions of interest are switched and the order of calculation of the partial regions is updated, the control amounts do not need to be calculated again. This can reduce the calculation cost.

(Second Modification of First Exemplary Embodiment)

Instead of performing weighted averaging, the displacement field calculation unit 104 can be configured to calculate the control amount by sequentially expanding the partial region to be subjected to the cost calculation of Eq. (2). In such a case, the displacement field calculation unit 104 initially obtains the control amount of the first partial region in the displacement field calculation order. With that control amount as an initial value, the displacement field calculation unit 104 then obtains a control amount of the displacement field calculation target region $\Omega_t$ including both the first partial region in the displacement field calculation order and the next partial region in the displacement field calculation order. The displacement field calculation unit 104 repeats such processing in succession to finally perform control amount calculation by simultaneously evaluating all the partial regions. As the number of partial regions to be simultaneously evaluated increases, the calculation cost increases. However, the calculated control amount is guaranteed to be at least a local optimal solution, which enables more accurate calculation of the control amount.

(Third Modification of First Exemplary Embodiment)

Figure 12:
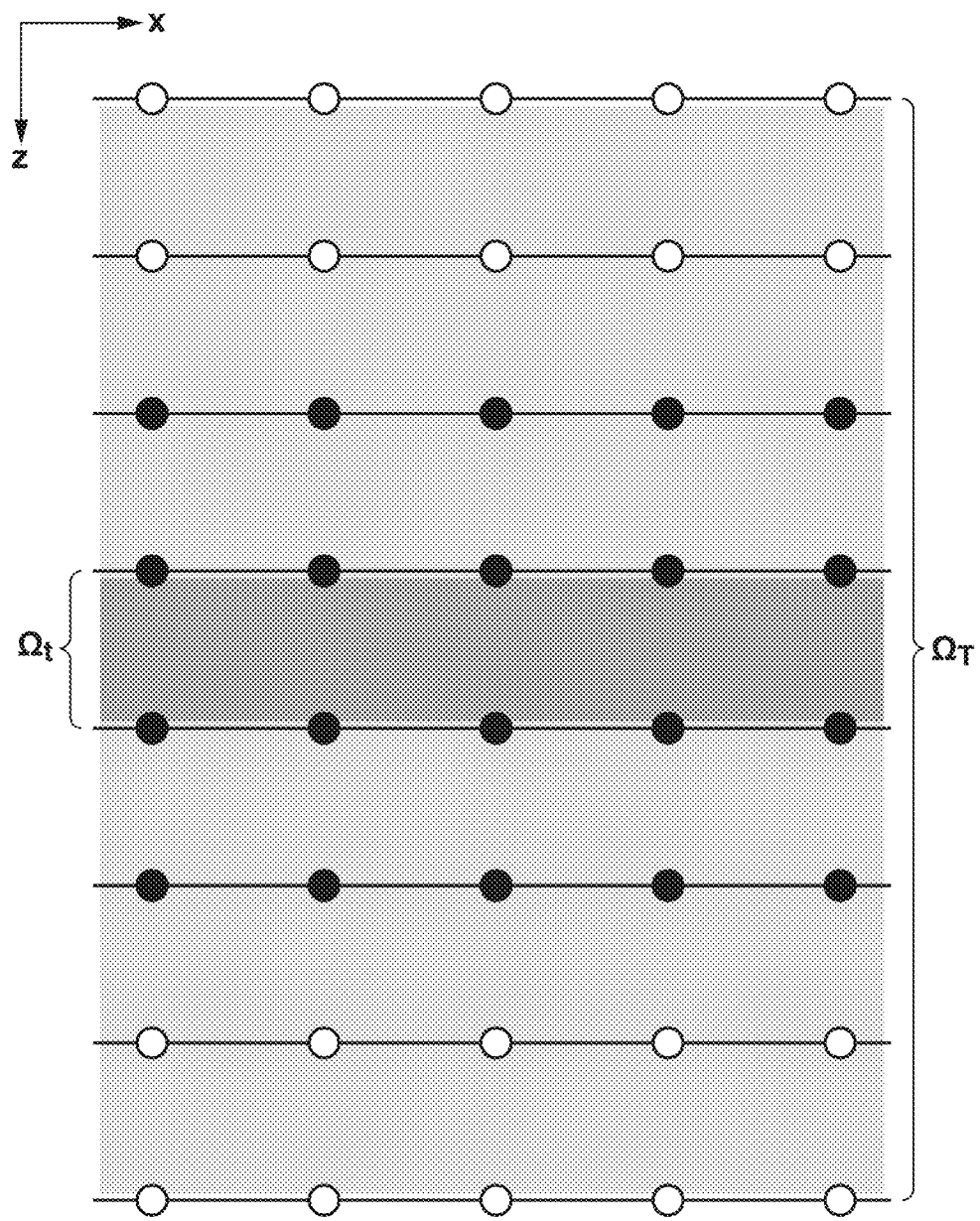
FIG. 12 is a diagram illustrating a displacement field calculation target region.

The displacement field calculation unit 104 can be configured to, when calculating the control amount of a certain control point, simultaneously evaluate all partial regions with which the control point is involved. FIG. 12 is a schematic diagram illustrating "all partial regions with which control points $P_t$ are involved" when a partial region is selected as the displacement field calculation target region $\Omega_t$. Like FIG. 5, FIG. 12 illustrates the second image and the FFD control point group in a two-dimensional schematic view taken in a direction (Y-axis direction) parallel to the cross sections. Suppose that the displacement field calculation target region $\Omega_t$ (region illustrated in dark gray in FIG. 12) is a displacement field evaluation target region. A control point group $P_t$ involved with the deformation of the displacement field evaluation regret region $\Omega_t$ includes 20 control points that are illustrated by black circles in FIG. 12. The displacement field calculation unit 104 calculates a region $\Omega_T$ affected by the foregoing control point group $P_t$. In FIG. 12, the region $\Omega_T$ is illustrated in light gray. The displacement field calculation unit 104 performs displacement field calculation by using the region $\Omega_T$ as the target region of the cost calculation by Eq. (2). If another partial region is selected as the displacement field calculation target region $\Omega_t$ and the deformation of the displacement field calculation target region $\Omega_t$ involves a control point or points of which a control amount has been calculated, such a control point(s) is/are not subjected to optimization.

In the third modification, the control amount of a control point is calculated by simultaneously subjecting the widest range affected by the control point to the cost calculation. The calculation can thus produce the same control amount as when the entire image is simultaneously evaluated. Such calculation of the control amount is equivalent to calculating a local optimal solution with the entire image as the evaluation target from the beginning. This provides the effect that an inappropriate local optimal solution far different from a global optimal solution is less likely to result as compared to the case of the second modification where the evaluation target range is sequentially expanded. The use of the implementation method according to the third modification increases the calculation cost but enables displacement field calculation with higher accuracy than in the first and second modifications.

A second exemplary embodiment will be described below. The first exemplary embodiment has been described by using an example where the similarity between the first and second images is used for cost calculation in the displacement field calculation in step S2040. In the first exemplary embodiment, the user can only make operations to switch the cross sections of interest and observe the result of the displacement field calculation.

An image processing apparatus according to the second exemplary embodiment of the present invention is mainly characterized by the use of position information (corresponding point information) about corresponding points between the first and second images for deformation estimation and by the provision of a function suitable for the user to correct the corresponding point information in an interactive manner. If the user makes a correction to a displacement field in an interactive manner during registration using the corresponding point information, the image processing apparatus calculates the corrected displacement field from a region close to the cross section of interest of the user, and displays the deformed image. The corresponding point information is manually or automatically input. For displacement field calculation, part or all of the cost function is defined based on such corresponding point information. The image processing apparatus accepts the user's operation and corrects the corresponding point information during the correction field calculation. Hereinafter, only differences of the image processing apparatus according to the present exemplary embodiment from the first exemplary embodiment will be described.

Figure 7:
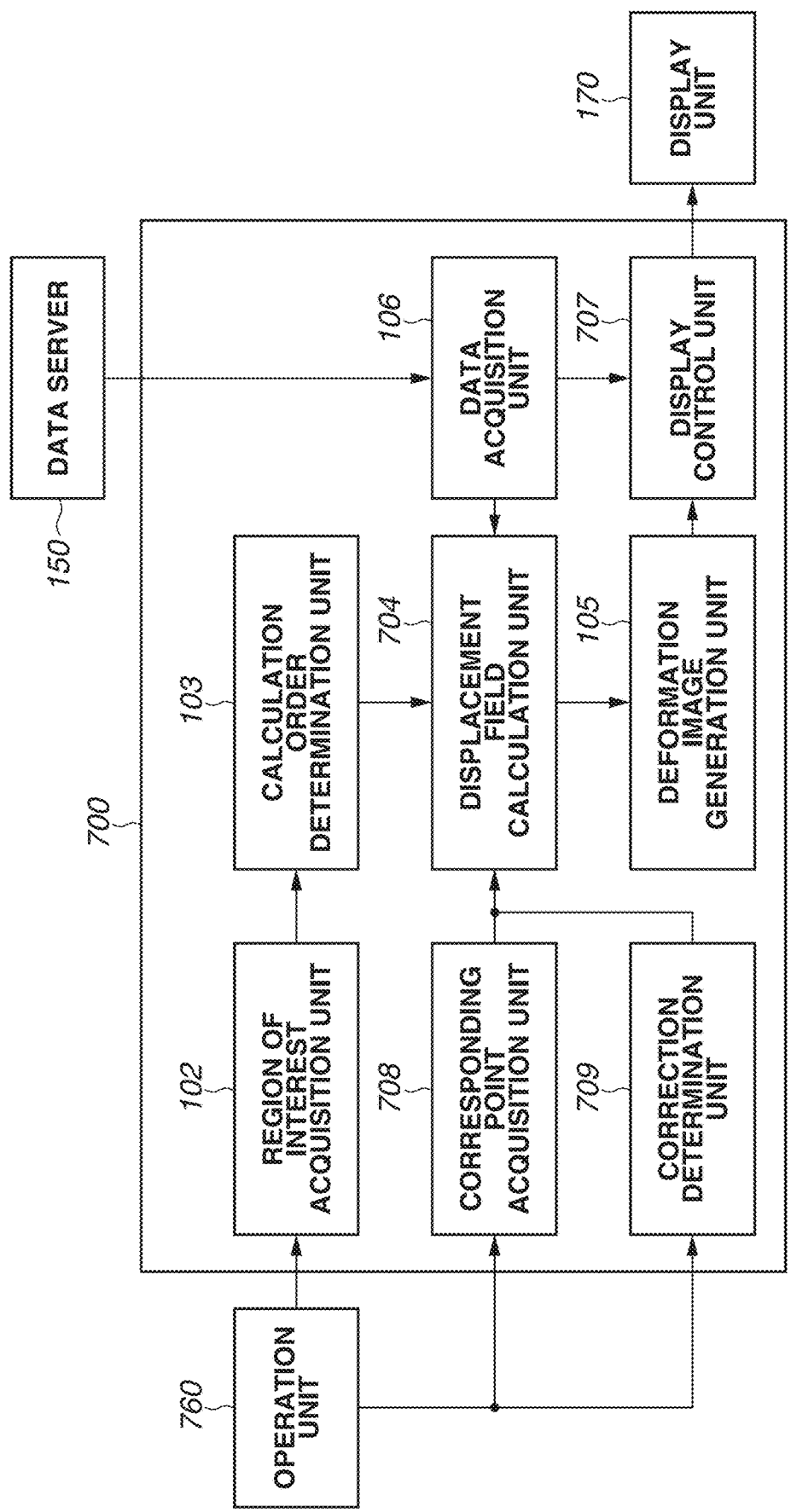
FIG. 7 is a diagram illustrating a configuration example of an image processing apparatus according to a second exemplary embodiment.

FIG. 7 is a diagram illustrating a configuration example of an image processing system according to the second exemplary embodiment of the present invention. As compared to the image processing system of FIG. 1, the image processing system of FIG. 7 includes an operation unit 760 and an image processing apparatus 700 instead of the operation unit 160 and the image processing apparatus 100. The image processing apparatus 700 includes, in addition to a region of interest acquisition unit 102, a calculation order determination unit 103, a deformed image generation unit 105, and a data acquisition unit 106, a displacement field calculation unit 704, a display control unit 707, a corresponding point acquisition unit 708, and a correction determination unit 709. In FIG. 7, portions similar to those of FIG. 1 are designated by the same reference numerals. A description thereof will be omitted.

Like the operation unit 160 according to the first exemplary embodiment, the operation unit 760 inputs information about a cross section of interest into the image processing apparatus 700. The operation unit 760 further accepts the user's mouse and/or keyboard operations, and inputs corresponding points specified by the user into the image processing apparatus 700 via the corresponding point acquisition unit 708. During displacement field calculation, the operation unit 760 accepts the user's GUI operation, and inputs determination information about whether to make a correction into the image processing apparatus 700 via the correction determination unit 709.

The corresponding point acquisition unit 708 acquires a plurality of corresponding points (corresponding point group information) for associating a point or points on the first image with a point or points on the second image from the operation unit 760. The corresponding point acquisition unit 708 acquires the corresponding points on the first and second images according to the user's instructions, and stores the corresponding points in a not-illustrated storage unit. The corresponding point acquisition unit 708 adds or deletes a corresponding point group stored in the storage unit or changes a position of the corresponding point group according to the user's instructions. The corresponding point acquisition unit 708 then outputs the corresponding point group information stored in the storage unit to the displacement field calculation unit 704.

The correction determination unit 709 determines, based on the determination information input from the operation unit 760, whether to intervene in displacement field calculation in process and correct the corresponding point group. The correction determination unit 709 then outputs determination information about whether to make a correction to the displacement field calculation unit 704.

Like the displacement field calculation unit 104 according to the first exemplary embodiment, the displacement field calculation unit 704 calculates a displacement field (deformation) between the first and second images. In the present exemplary embodiment, the displacement field calculation unit 704 performs displacement field calculation with the corresponding point group information input from the corresponding point acquisition unit 708 as a constraint condition. The displacement field calculation unit 704 accepts the determination information about whether to make a correction from the correction determination unit 709. If a correction is determined to be made, the displacement field calculation unit 704 discontinues the displacement field calculation. For example, after a correction by a correction unit (the corresponding point acquisition unit 708 and a GUI 906 (FIG. 9)) is completed, the displacement field calculation unit 704 resumes the processing for calculating the displacement field (modification) based on the corrected corresponding point group information.

Like the display control unit 107 according to the first exemplary embodiment, the display control unit 707 performs control to cause the display unit 170 to display the first image, the second image, and a deformed image formed by deforming the first image. The display control unit 707 also performs control to cause the display unit 170 to display a GUI for inputting corresponding points and obtaining instructions about correction from the user.

Figure 8:
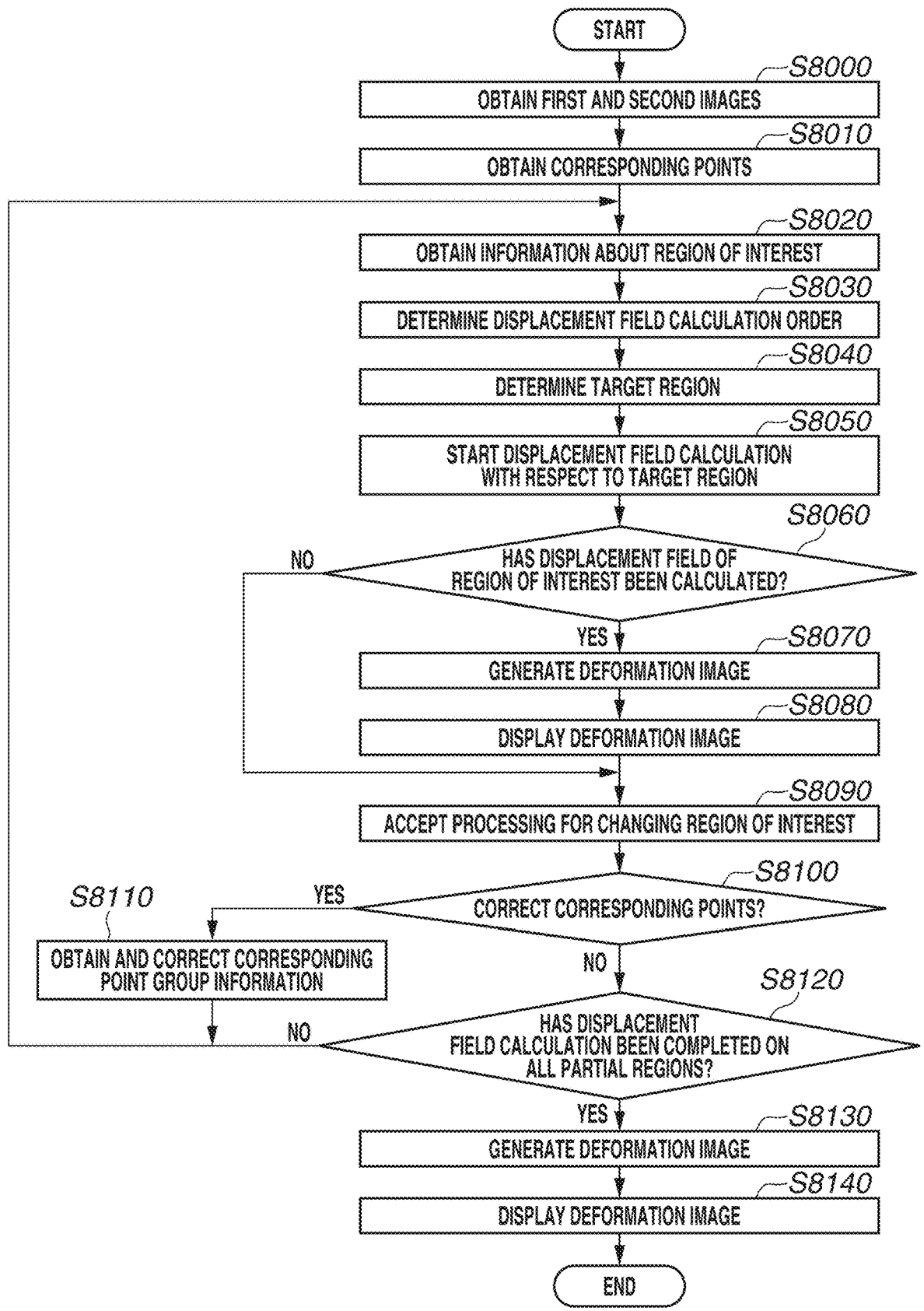
FIG. 8 is a flowchart illustrating a processing procedure according to the second exemplary embodiment.

FIG. 8 is a flowchart illustrating the entire processing procedure performed by the image processing apparatus 700. The processing of steps S8000, S8020 to S8040, S8060 to S8090, and S8120 to S8140 is similar to that of steps S2000, S2010 to S2030, S2050 to S2080, and S2110 to S2130 in FIG. 2 of the first exemplary embodiment, respectively.

Figure 9:
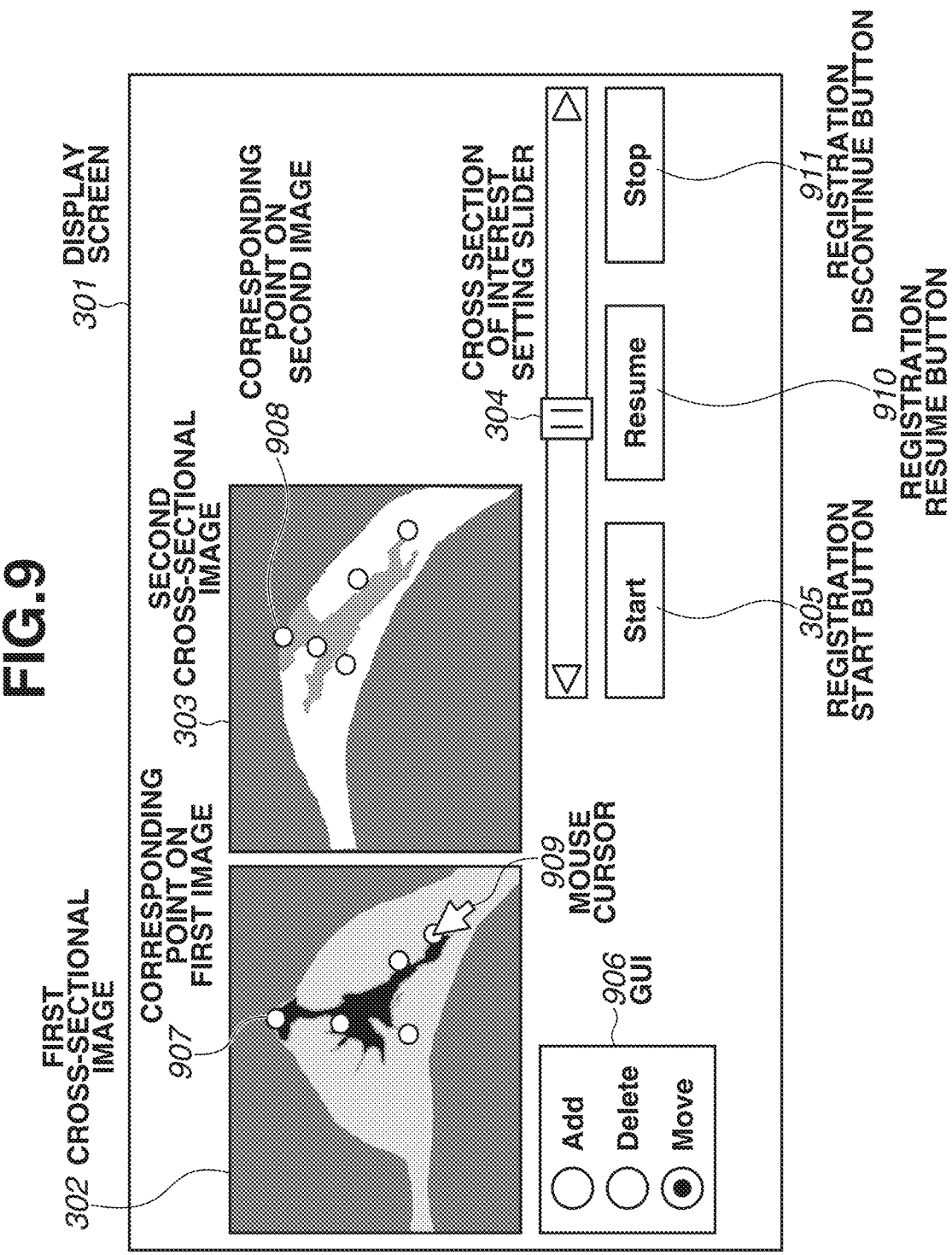
FIG. 9 is a diagram illustrating a screen configuration of the display unit when an input image is displayed thereon, according to the second exemplary embodiment.

After step S8000, in step S8010, the corresponding point acquisition unit 708 acquires corresponding points between the first and second images according to the user's instructions. FIG. 9 illustrates an example of a display screen 301 displayed on the display unit 170 at the time of obtaining corresponding points. The display control unit 707 generates predetermined cross-sectional images from the respective first and second images according to the user's instructions, and displays the cross-sectional images in the display screen 301 of the display unit 170 as a first cross-sectional image 302 and a second cross-sectional image 303, respectively. The user operates a mouse cursor 909 to initially click on a characteristic position on the first cross-sectional image 302 and input the position as a point of interest. A corresponding point 907 on the first image is an example of the point of interest. In terms of a mammary gland MRI image, examples of the "characteristic position" include a nipple position, a vessel branch position, and a projecting position on a mammary gland fat border.

Similarly, the user then operates the mouse cursor 909 to click on the position of a point on the second cross-sectional image 303, which corresponds to the corresponding point 907 on the first image. A corresponding point 908 on the second image is such a point. In such a manner, the user inputs corresponding points (a pair of corresponding points on the two images). The corresponding point acquisition unit 708 acquires information about the corresponding points thus input by the user (a set of coordinates of the corresponding points between the first and second images), and adds the information to the corresponding point group information stored in the not-illustrated storage unit. After the user finishes inputting a plurality of corresponding points, the processing proceeds to step S8020.

The foregoing operation method is an example, and the corresponding point acquisition unit 708 can be configured to use any arbitrary operation method for implementing the input of corresponding points. The corresponding point acquisition unit 708 can be configured to use image feature point extraction processing such as an interest operator to automatically extract corresponding point candidates, from which the user can select corresponding points.

After step S8040, in step S8050, the displacement field calculation unit 704 calculates a control amount vector expressing the displacement field with respect to the target region in a similar manner to in the first exemplary embodiment. The present exemplary embodiment differs from the first exemplary embodiment in that the cost function uses a distance value between corresponding points, not a similarity between the images.

The cost function for calculating a control amount by the displacement field calculation unit 704 is expressed by the following Eq. (5):

$$f(\Omega_t, v_t) = \frac{1}{N_t} \times \sum_{x_{2i} \in \Omega_t} \|D(x_{2i}, v_t) - x_{1i}\| \qquad (5)$$

Here, $N_t$ is the number of corresponding points of the second image included in the displacement field calculation target region $\Omega_t$ among a corresponding point group obtained up to the previous step. $x_{1i}$ and $x_{2i}$ indicate the coordinates of the ith corresponding point in the first and second images, respectively, among the group of $N_t$ corresponding points satisfying the foregoing condition. This calculation means that an average of the distance values between the corresponding points after deformation is regarded as a cost. In step S8050, as the processing for calculating the displacement field in the displacement field calculation target region $\Omega_t$, the displacement field calculation unit 704 determines the control amount $v_t$ that minimizes the cost function of Eq. (5) with the control amount $v_t$ of the control point group $P_t$ involved with the deformation of the displacement field calculation target region $\Omega_t$ as an unknown parameter. Any conventional cost function based on corresponding points can be used, aside from that of the foregoing Eq. (5). For example, instead of a function that includes only data terms as costs like the foregoing Eq. (5), the cost function can further include a regularization term or terms for evaluating smoothness of deformation. The cost function can further include the similarity between images used in the first exemplary embodiment.

Each time the corresponding point group is corrected in step S8100 to be described below, the displacement field calculation unit 704 updates the cost function expressed by the foregoing Eq. (5) based on the corrected information. The displacement field calculation unit 704 then calculates the displacement field based on the updated cost function. If the corresponding point group included in the displacement field calculation target field $\Omega_t$ changes as a result of the update of the corresponding point group and the displacement field with respect to the target region has already been calculated, the displacement field calculation unit 704 discards the calculation result and performs the displacement field calculation again. The processing then proceeds to step S8060.

After step S8090, in step S8100, the correction determination unit 709 determines whether to discontinue the current displacement field calculation processing and make a correction to the corresponding point group, depending on whether a registration discontinue button 911 of FIG. 9 is pressed. If the corresponding points are determined to be corrected (YES in step S8100), the processing proceeds to step S8110. If the corresponding points are determined to not be corrected (NO in step S8100), the processing proceeds to step S8120.

In step S8110, the corresponding point acquisition unit 708 acquires the corresponding point group information stored in the not-illustrated storage unit and corrects the corresponding point group information according to the user's instructions. By such processing, the corresponding point group information used in the displacement field calculation is updated. The corresponding point acquisition unit 708 outputs the updated corresponding point group information to the displacement field calculation unit 704. The corresponding point acquisition unit 708 and the GUI 906 of FIG. 9 function as the correction unit for correcting the corresponding point group information based on operation inputs. When the correction unit (the corresponding point acquisition unit 708 and the GUI 906) makes a correction, the displacement field calculation unit 704 discontinues the calculation processing for calculating the displacement field (deformation) according to an operation input to the registration discontinue button 911 for giving an instruction to discontinue the displacement field calculation processing. After the correction by the correction unit (the corresponding point acquisition unit 708 and the GUI 906) is completed, the displacement field calculation unit 704 resumes the calculation processing for calculating the displacement field (deformation) according to an operation input to a registration resume button 910 for giving an instruction to resume the discontinued calculation processing. After step S8110, the processing proceeds to step S8020.

FIG. 9 is a diagram illustrating an example of the display screen 310 when a correction is made to a corresponding point group. The user initially specifies which operation to make, "add," "delete," or "move," by using the GUI 906 for selecting a method of corresponding point correction. The user then operates the mouse cursor 909 to make a correction to the corresponding point group. In the case of making an "add" operation, like the operation in step S8010, the user specifies corresponding points on the first and second cross-sectional images 302 and 303, respectively. In the case of making a "delete" operation, the user specifies a corresponding point to be deleted on either one of the cross-sectional images 302 and 303, and then executes deletion processing by a keyboard operation. In the case of making a "move" operation, the user specifies a corresponding point to be moved on either one of the cross-sectional images 302 and 303, and then drags the mouse pointer to move the point. The corresponding point acquisition unit 708 thus acquires the user-input information (corresponding point information) for correcting a corresponding point or points, and modifies (adds, deletes, or changes) the corresponding point group information stored in the not-illustrated storage unit according to the obtained corresponding point information. When the user completes the correction of the corresponding point(s) and then the pressing of the registration resume button 910 is accepted, the processing proceeds to step S8020. The foregoing operation method is just an example, and the correction unit can be configured to use any arbitrary operation method for implementing the foregoing operations.

According to the present exemplary embodiment, displacement field calculation can be performed based on not only the similarity between images but also the corresponding point group information. In addition, the corresponding point group can be corrected in an interactive manner even during displacement field calculation.

A third exemplary embodiment will be described below. The first and second exemplary embodiments have been described by using an example where the displacement field calculation order is set by using a set of cross sections as a unit of partial regions, with the high priority given to the cross section of interest set by the user. An image processing apparatus according to the third exemplary embodiment of the present invention is mainly characterized by determining the displacement field calculation order according to the density of corresponding point information input to the first and second images. A region in which input corresponding points are dense can be considered to include a lot of anatomical features of which the user wants to observe a deformation result. Such a region is determined to have high priority in displacement field calculation. On the contrary, a region in which input corresponding points are sparse is determined to have low priority in displacement field calculation.

Only differences of the image processing apparatus according to the present exemplary embodiment from the second exemplary embodiment will be described below. An image processing apparatus 700 according to the present exemplary embodiment has the same configuration as that of FIG. 7. There is only difference in the processing of the calculation order determination unit 103.

The calculation order determination unit 103 obtains correspondence point group information from the corresponding point acquisition unit 708, and calculates a "corresponding point density" in each partial region based on the distribution of the corresponding point group information. Based on the calculated corresponding point density of each partial region, the calculation order determination unit 103 then determines the order of displacement field calculation. Unlike the first and second exemplary embodiments, the information about the region of interest specified by the user is not taken into account. The calculation order determination unit 103 outputs the determined displacement field calculation order of the partial regions to the displacement field calculation unit 704.

The entire processing procedure performed by the image processing apparatus 700 according to the present exemplary embodiment is similar to that of FIG. 8. There is a difference in the processing of step S8030. The processing that the calculation order determination unit 103 performs in step S8030 is described below.

In step S8030, the calculation order determination unit 103 calculates the "corresponding point density" of each partial region based on the corresponding point group information obtained from the corresponding point acquisition unit 708. The calculation order determination unit 103 then determines the displacement field calculation order of the plurality of partial regions so that the higher the density of corresponding points in a partial region is among the plurality of partial regions, the earlier the partial region comes in the displacement field calculation order.

Figure 10:
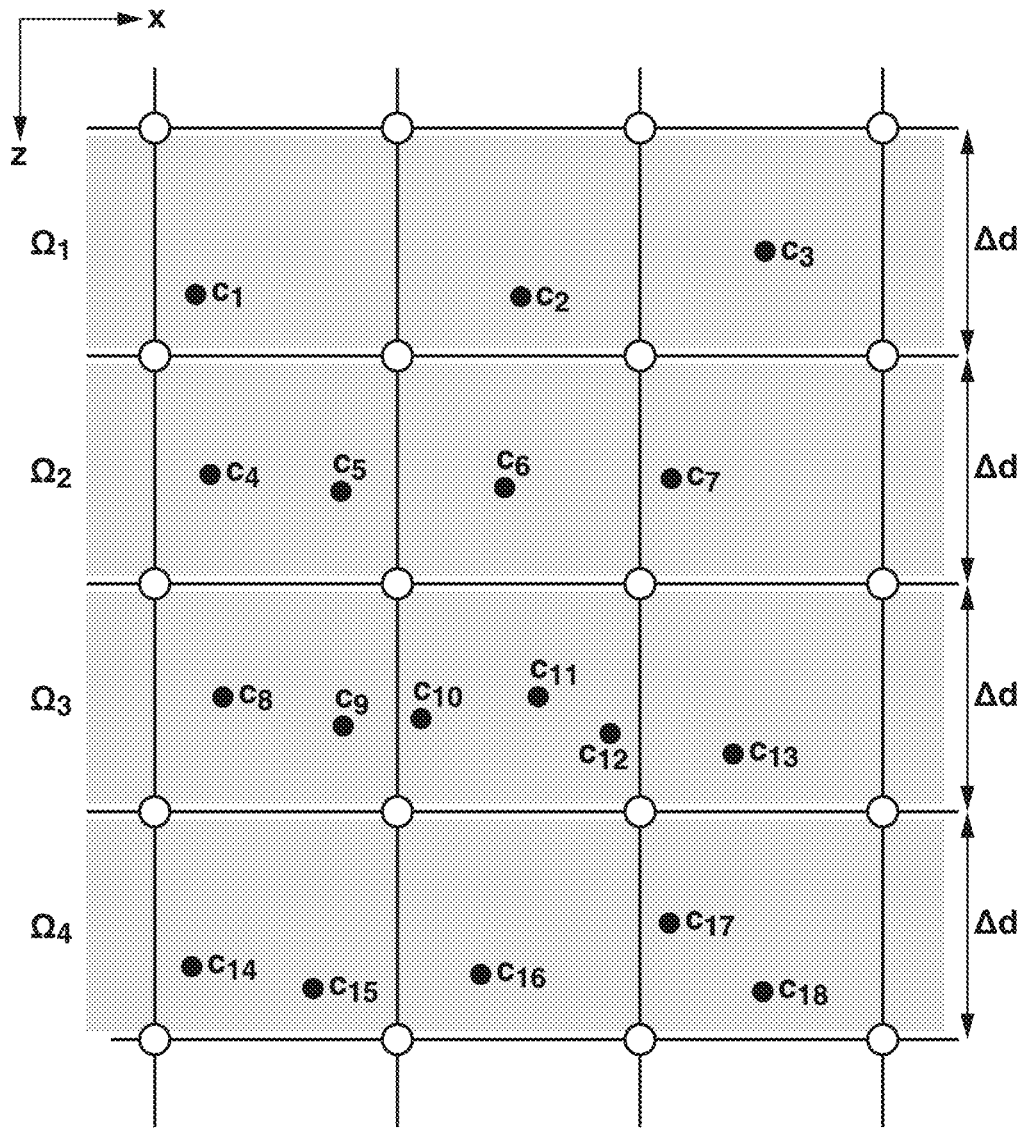
FIG. 10 is a schematic diagram illustrating a displacement field calculation order determination procedure according to a third exemplary embodiment.

FIG. 10 is a diagram for specifically describing the method for calculating the foregoing "corresponding point density." Like FIG. 5, FIG. 10 illustrates a two-dimensional schematic view of a second image as seen in the Y-axis direction. Eighteen corresponding points $c_1, \ldots, c_{18}$ are input to the second image. Each cross-sectional image has a length of $l_x$ and $l_y$ in the X- and Y-axis directions, respectively. In other words, each cross-sectional image, a two-dimensional image, has an area of $l_x \times l_y$. The partial regions $\Omega_1, \Omega_2, \Omega_3$, and $\Omega_4$ each have a length (slab thickness) of $\Delta d$ in the Z-axis direction.

The corresponding point density of each partial region is calculated under the foregoing precondition. In the example of FIG. 10, the numbers of corresponding points included in the partial regions $\Omega_1, \Omega_2, \Omega_3$, and $\Omega_4$ are three, four, six, and five, respectively. For generalization, a set of corresponding points included in a partial region $\Omega$ will be denoted as $C_\Omega$, and the number of elements in the set $C_\Omega$ as $|C_\Omega|$. The corresponding point density $M(\Omega)$ of the partial region $\Omega$ is expressed by the following Eq. (6):

$$M(\Omega) = \frac{|C_\Omega|}{\Delta d \times l_x \times l_y} \quad (6)$$

The calculation order determination unit 103 calculates the corresponding point density $M(\Omega)$ of each partial region according to the foregoing equation Eq. (6). The calculation order determination unit 103 then sets the displacement field calculation order of the partial regions in descending order of the corresponding point densities $M(\Omega)$. In the example illustrated in FIG. 10, the denominator of the foregoing Eq. (6) is the same for any partial region. The displacement field calculation order from the earliest is thus $\Omega_3, \Omega_4, \Omega_2$, and $\Omega_1$.

The region of interest acquisition unit 102 can set a value called "degree of importance" for each individual corresponding point. The calculation order determination unit 103 can calculate a corresponding point density by assigning weights to the corresponding points according to the degrees of importance. The degrees of importance are obtained according to the user's operation in obtaining the corresponding points in steps S8010 and S8110. For example, when the user clicks on a point in an image to specify a corresponding point using a mouse, the pressing of a certain key on a keyboard is simultaneously accepted to set the degree of importance. For example, if the user specifies a corresponding point while pressing the "1" key, the corresponding point is obtained with a degree of importance of 1. If the user specifies a corresponding point while pressing the "2" key, the corresponding point is obtained with a degree of importance of 2. In such a case, information about which corresponding point the user gives higher priority to can be reflected on the determination of the calculation order.

According to the present exemplary embodiment, the calculation order of the displacement field calculation can be determined based on the input corresponding point information. A deformation result of a region in which input corresponding points are dense and that is considered to be of high interest to the user can thus be displayed quickly.

(Modification of Third Exemplary Embodiment)

The third exemplary embodiment has been described by using an example where the order of displacement field calculation is determined based on the corresponding point information input to the first and second images. However, the calculation order determination unit 103 can be configured to determine the order of displacement field calculation without using the corresponding point information. For example, a similarity can be calculated between all the partial regions on the second image and the corresponding partial regions of the first image, and the displacement field in the partial regions can be calculated in ascending order of the similarity. The calculation order determination unit 103 determines the displacement field calculation order of a plurality of partial regions so that the lower the similarity between the first image and a partial region of the second image is among the plurality of partial regions, the earlier the partial region comes in the displacement field calculation order. In such a case, the displacement field calculation is performed later in partial regions where the first and second images have not much difference and deformation will result in few changes. The displacement field calculation is performed by priority in partial regions where the first and second images have a large difference and the displacement field calculation will be highly effective. This provides the effect that an approximate result of deformation can be observed in an early stage before the displacement field calculation is performed on all the regions.

Alternatively, image processing such as edge extraction can be applied to the partial regions of the second image, and the order of displacement field calculation can be determined according to the resulting image features. For example, partial regions including a lot of voxels determined to be an edge can be given high priority. Other partial regions can be given low priority. The calculation order determination unit 103 determines the displacement field calculation order of a plurality of partial regions so that the more edges a partial region includes among the plurality of partial regions, the earlier the partial region comes in the displacement field calculation order. In such a case, the displacement field calculation is performed preferentially from characteristic regions that include a lot of edges. Like the case based on the similarity between images, this provides the effect that an approximate result of deformation can be observed in an early stage.

According to the present modification, the order of displacement field calculation can be determined based on the features of the input images without corresponding point information input by the user.

A fourth exemplary embodiment will be described below. The first to third exemplary embodiments have been described by using an example where the displacement field calculation order is determined and the displacement field calculation processing is performed in units of a set of cross sections (slab) in the second image. An image processing apparatus according to the fourth exemplary embodiment of the present invention is mainly characterized in that the partial regions in which the displacement field calculation is performed are not limited to sets of cross sections but are arbitrary partial regions. The image processing apparatus according to the present exemplary embodiment accepts the user's operation and specifies a "region of interest" to observe a deformation result thereof by the highest priority, instead of obtaining a cross section of interest in the first exemplary embodiment. The image processing apparatus then calculates the control value of a control point group involved with the displacement field calculation of the region of interest by the highest priority. For the other regions not included in the region of interest, the image processing apparatus determines the order of displacement field calculation according to distances from the region of interest.

Only differences between the image processing apparatus according to the present exemplary embodiment and that according to the first exemplary embodiment will be described below. An image processing apparatus 100 according to the present exemplary embodiment has the same configuration as that of FIG. 1. There are differences in the processing of the region of interest acquisition unit 102, the calculation order determination unit 103, and the displacement field calculation unit 104.

The region of interest acquisition unit 102 acquires a region of interest of which a deformation result is desired to be preferentially observed in the second image according to the user's instructions. The region of interest acquisition unit 102 stores information about the coordinate values of a voxel group of the second image included in the region of interest into the not-illustrated storage unit. The region of interest acquisition unit 102 then outputs the coordinate values of the voxel group stored in the storage unit to the calculation order determination unit 103.

The calculation order determination unit 103 determines the calculation order of the displacement field over the entire region of the second image based on the information about the region of interest. The calculation order determination unit 103 then outputs the determined displacement field calculation order to the displacement field calculation unit 104.

The displacement field calculation unit 104 calculates the displacement field (deformation) between the first and second images. The displacement field calculation unit 104 initially determines a partial region in which the displacement field (displacement field calculation target region) is to be calculated based on the displacement field calculation order of the partial regions, determined by the calculation order determination unit 103. The displacement field calculation unit 104 then performs displacement field calculation on only the displacement field calculation target region, and stores the calculation result into the not-illustrated storage unit. The displacement field calculation unit 104 also outputs the calculation result to the deformed image generation unit 105.

The entire processing procedure performed by the image processing apparatus 100 according to the present exemplary embodiment is similar to that of FIG. 2. There are differences in the processing of steps S2010 and S2020. The processing of steps S2010 and S2020 is described below.

In step S2010, the region of interest acquisition unit 102 acquires information about which region on the second image to obtain as a region of interest according to the user's instructions. The region of interest acquisition unit 102 then calculates a control point grid region including the region of interest based on a grid on which the FFD control point group is arranged. The region of interest acquisition unit 102 acquires the control point grid region as a region of interest for displacement field calculation.

For example, the region of interest is specified in the following procedure. The region of interest acquisition unit 102 initially accepts the user's mouse and/or keyboard operation to acquire a center point of a region of interest. An example of the center point of a region of interest is the center position of a tumor region in a mammary gland MRI image including the tumor region. Next, the region of interest acquisition unit 102 similarly accepts the user's mouse and/or keyboard operation to acquire the length of the radius of the region of interest. In such a manner, the region of interest acquisition unit 102 can set a spherical region of interest in the second image.

The foregoing operation method is an example, and the region of interest acquisition unit 102 can be configured to use any arbitrary operation method for implementing the specification of a region of interest in a three-dimensional image. For example, the region of interest acquisition unit 102 can use a method for specifying a region of interest by using a conventional function of commercially-available paint software of filling an arbitrary region freehand. If information about a region or coordinates indicating a site of interest, such as a tumor and an anatomical site (nipple, etc.), is included as supplementary information about the second image obtained in step S2000, such a region or coordinates can be set as the region of interest.

Figure 11:
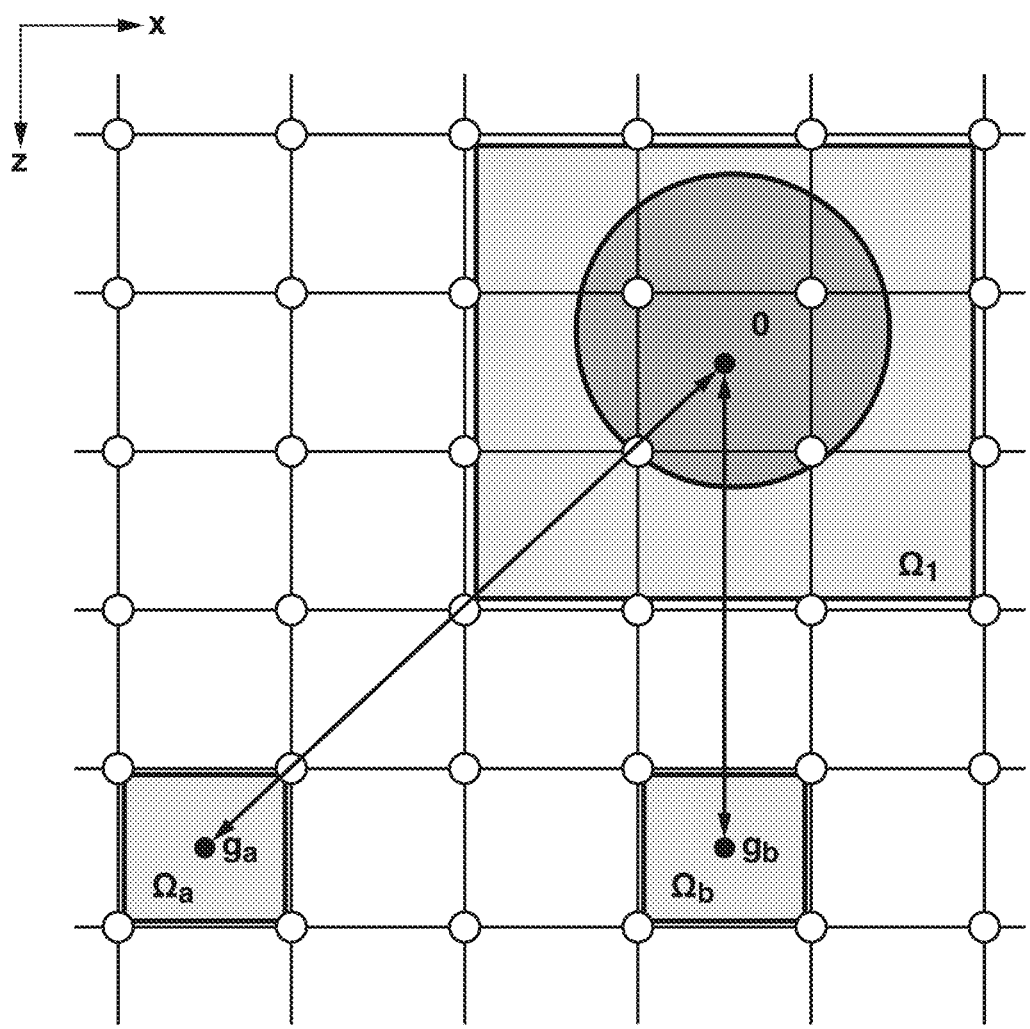
FIG. 11 is a flowchart illustrating a processing procedure according to a fourth exemplary embodiment.

FIG. 11 is a schematic diagram for describing a processing procedure for calculating a region of interest for displacement field calculation from a region of interest obtained by accepting the user's operation. Like FIG. 5 of the first exemplary embodiment, FIG. 11 illustrates the second image and the FFD control point group in a two-dimensional schematic view taken in a direction (Y-axis direction) parallel to the cross sections.

The region of interest acquisition unit 102 initially calculates partial regions in which "the same control point group is involved with deformation" based on the grid on which the FFD control point group is arranged. Unlike the first exemplary embodiment, the partial regions calculated here are regions of rectangular solid shape, surrounded by a grid of a control point group. In FIG. 11, regions $\Omega_a$ and $\Omega_b$ filled in gray are examples of the calculated partial regions. While FIG. 11 illustrates only the regions $\Omega_a$ and $\Omega_b$ as examples of the partial regions, the calculation order determination unit 103, in actual processing, performs the calculation of partial regions on the entire second image and thereby divides the entire region of the second image into partial regions of rectangular solid shapes.

Next, the region of interest acquisition unit 102 calculates a set of partial regions including a region of interest obtained by accepting the user's operation. In FIG. 11, a circular region filled in dark gray is an example of the region of interest obtained in step S2010. The calculation order determination unit 103 obtains partial regions that include any part of the region of interest collectively as a new region of interest. In FIG. 11, a region $\Omega_t$ filled in light gray is an example of the region of interest obtained.

In step S2020, the calculation order determination unit 103 determines the order of displacement field calculation over the entire region of the second image based on the information about the region of interest obtained in step S2010.

Referring to FIG. 11, the method for determining the displacement field calculation order will be described. The region of interest $\Omega_t$ is calculated by the processing of the region of interest acquisition unit 102 in step S2010. The calculation order determination unit 103 initially sets the region of interest $\Omega_t$ as the region in which the displacement field calculation is performed by the highest priority. Next, the calculation order determination unit 103 calculates the calculation order about all the partial regions other than the region of interest $\Omega_t$. The calculation order determination unit 103 determines the calculation order by comparing distances between the centers of gravity of the partial regions. For example, in the case of calculating the calculation order of the partial regions $\Omega_a$ and $\Omega_b$ in FIG. 11, the distance between the centers of gravity of $\Omega_t$ and $\Omega_a$ is greater than that between the centers of gravity of $\Omega_t$ and $\Omega_b$. In such a case, the calculation order determination unit 103 sets the calculation order of the partial region $\Omega_b$ before that of the partial region $\Omega_a$. The calculation order determination unit 103 stores order information set thus with respect to the partial regions of the second image into the not-illustrated storage unit.

According to the present exemplary embodiment, the unit of displacement field calculation is not limited to a set of cross sections. This can reduce time taken until the user can observe a deformation result, for example, even if the range of which the user wants to quickly observe deformation extends over a large number of cross sections.

Other Embodiments

Embodiment(s) of the present invention can also be realized by a computer of a system or apparatus that reads out and executes computer executable instructions (e.g., one or more programs) recorded on a storage medium (that may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-157632, filed Aug. 7, 2015, which is hereby incorporated by reference herein in its entirety.

What is claimed is:

1. An image processing apparatus configured to calculate deformation between a first image and a second image, the image processing apparatus comprising:
   an acquisition unit configured to acquire position information of a cross section of interest in the second image designated by a user, a cross sectional image of the cross section of interest being displayed on a display unit;
   a calculation order determination unit configured to determine, based on the position information of the cross section of interest, calculation order of a plurality of partial regions into which the second image is divided;
   a calculation unit configured to calculate the deformation for deforming the first image to register with the second image for each of the plurality of partial regions in the determined calculation order of the plurality of partial regions;
   a deformed image generation unit configured to generate a deformed image by deforming the first image to register with the second image based on the calculated deformation of the plurality of partial regions; and
   a display control unit configured to cause the display unit to display the generated deformed image,
   wherein the calculation order determination unit determines the calculation order such that a first calculation of a first partial region corresponding to the cross section of interest designated by the user is the earliest and a second calculation of a second partial region in the plurality of partial regions is earlier as the second partial region is closer to the cross section of interest, based on the position information of the cross section of interest.

2. The image processing apparatus according to claim 1, wherein, before the calculation unit finishes calculating the deformation of all partial regions, the deformed image generation unit generates a deformed image of the first image corresponding to part of the plurality of partial regions for which the calculation unit has finished calculating the deformation, and the display control unit causes the display unit to display the deformed image of the first image corresponding to the part of the plurality of partial regions.

3. The image processing apparatus according to claim 1, wherein if the calculation order of the plurality of partial regions is changed before the calculation unit finishes calculating the deformation of all partial regions, the calculation unit discontinues calculating the deformation, the calculation order determination unit changes the calculation order of the plurality of partial regions, and the calculation unit calculates the deformation between the first image and the plurality of partial regions of the second image in the changed calculation order.

4. The image processing apparatus according to claim 1, wherein the display control unit is configured to cause the display unit to display the deformed image and the second image.

5. The image processing apparatus according to claim 1, wherein the display control unit is configured to cause the display unit to display a cross-sectional image of the deformed image of the first image as the deformed image.

6. The image processing apparatus according to claim 5, wherein the plurality of partial regions correspond to cross sections or cross section groups constituting the second image, and
wherein the display control unit is configured to cause the display unit to display a range of partial regions calculated by the calculation unit.

7. The image processing apparatus according to claim 6, wherein the display control unit is configured to cause the display unit to display information indicating a position of the cross section of interest and information indicating the range of cross sections calculated by the calculation unit in association with each other.

8. The image processing apparatus according to claim 1, further comprising a corresponding point acquisition unit configured to acquire a corresponding point that associates a point on the first image with a point on the second image, wherein the calculation unit is configured to calculate the deformation between the first image and the second image for each of the plurality of partial regions based on the corresponding point.

9. The image processing apparatus according to claim 1, wherein
the calculation order determination unit determines the calculation order of the plurality of partial regions such that the closer the partial region is to the partial region corresponding to the cross section of interest designated by the user, the earlier the partial region is set to be in order.

10. The image processing apparatus according to claim 1, wherein the calculation unit:
calculates a control amount representing deformation amount between the first image and the second image for each of the plurality of partial regions in the determined calculation order of the plurality of partial regions,
calculate a new control amount by weighting the control amount on the basis of the determined calculation order of the plurality of partial regions, and
calculate the deformation between the first image and the second image for each of the plurality of partial regions on the basis of the new control amount.

11. The image processing apparatus according to claim 1, wherein the calculation unit calculates the deformation from a cross section close to the cross section of interest designated by the user.

12. The image processing apparatus according to claim 1, wherein the partial region corresponding to the cross section of interest designated by the user includes the cross section of interest.

13. The image processing apparatus according to claim 1, wherein the partial region that come first in the calculation order includes the cross section of interest.

14. The image processing apparatus according to claim 1, wherein the display control unit causes the display unit to display a range of the partial regions calculated by the calculation unit, on a bar for the user to designate the cross section of interest.

15. The image processing apparatus according to claim 14, wherein the display control unit causes the display unit to display, together with the bar, a knob to switch the cross section of interest.

16. An image processing method for calculating deformation between a first image and a second image, the image processing method comprising:
acquiring position information of a cross section of interest in the second image designated by a user,
displaying a cross-sectional image of the cross section of interest;
determining, based on the position information of the cross section of interest, calculation order of a plurality of partial regions into which the second image is divided;
calculating the deformation for deforming the first image to register with the second image for each of the plurality of partial regions in the determined calculation order of the plurality of partial regions;
generating a deformed image by deforming the first image to register with the second image based on the calculated deformation of the plurality of partial regions; and
displaying the generated deformed image,
wherein, in the determining the calculation order, the calculation order is determined such that a first calculation of a first partial region corresponding to the cross section of interest designated by the user is the earliest and a second calculation of a second partial region in the plurality of partial regions is earlier as the second partial region is closer to the cross section of interest, based on the position information of the cross section of interest.

17. A non-transitory computer-readable storage medium storing computer executable instructions for causing a computer to execute an image processing method for calculating deformation between a first image and a second image, the image processing method comprising:
acquiring position information of a cross section of interest in the second image designated by a user,
displaying a cross-sectional image of the cross section of interest;
determining, based on the position information of the cross section of interest, calculation order of a plurality of partial regions into which the second image is divided;
calculating the deformation for deforming the first image to register with the second image for each of the plurality of partial regions in the determined calculation order of the plurality of partial regions;
generating a deformed image by deforming the first image to register with the second image based on the calculated deformation of the plurality of partial regions; and
displaying the generated deformed image,
wherein, in the determining the calculation order, the calculation order is determined such that a first calculation of a first partial region corresponding to the cross section of interest designated by the user is the earliest and a second calculation of a second partial region in the plurality of partial regions is earlier as the second partial region is closer to the cross section of interest, based on the position information of the cross section of interest.

* * * * *